United States Patent
Taylor et al.

(10) Patent No.: US 9,524,536 B2
(45) Date of Patent: Dec. 20, 2016

(54) COMPRESSION TECHNIQUES FOR DYNAMICALLY-GENERATED GRAPHICS RESOURCES

(71) Applicant: INTEL CORPORATION, Santa Clara, CA (US)

(72) Inventors: Robert B. Taylor, Hillsboro, OR (US); Travis T. Schluessler, Hillsboro, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 14/341,467

(22) Filed: Jul. 25, 2014

(65) Prior Publication Data

US 2016/0027145 A1     Jan. 28, 2016

(51) Int. Cl.

| | |
|---|---|
| H04N 19/136 | (2014.01) |
| H04N 19/12 | (2014.01) |
| H04N 19/154 | (2014.01) |
| G06T 1/60 | (2006.01) |
| H04N 19/90 | (2014.01) |
| G09G 5/00 | (2006.01) |
| H04L 12/26 | (2006.01) |
| G06T 9/00 | (2006.01) |
| G06F 3/14 | (2006.01) |
| G09G 5/393 | (2006.01) |

(52) U.S. Cl.
CPC . *G06T 1/60* (2013.01); *G06F 3/14* (2013.01); *G06T 9/00* (2013.01); *G09G 5/001* (2013.01); *G09G 5/393* (2013.01); *H04L 43/0882* (2013.01); *H04N 19/12* (2014.11); *H04N 19/136* (2014.11); *H04N 19/154* (2014.11); *H04N 19/90* (2014.11); *G09G 2340/02* (2013.01); *G09G 2350/00* (2013.01); *G09G 2370/16* (2013.01)

(58) Field of Classification Search
None
See application file for complete search history.

(56) References Cited

U.S. PATENT DOCUMENTS

2008/0247641 A1 * 10/2008 Rasmusson ............. G06T 11/40
382/166
2010/0278442 A1    11/2010 Parsons et al.
(Continued)

OTHER PUBLICATIONS

Office Action received for Korean Patent Application No. 2015-0089764, mailed Apr. 20, 2016, 9 pages including 4 pages English translation.

(Continued)

*Primary Examiner* — Joni Richer

(57) ABSTRACT

Compression techniques for dynamically-generated graphics resources are described. In one embodiment, for example, an apparatus may comprise logic, at least a portion of which is in hardware, the logic to determine one or more usage characteristics of a dynamically-generated graphics resource, determine whether to compress the dynamically-generated graphics resource based on the one or more usage characteristics, and in response to a determination to compress the dynamically-generated graphics resource, select a compression procedure based on a graphics quality threshold for the dynamically-generated graphics resource. Other embodiments are described and claimed.

22 Claims, 10 Drawing Sheets

(56) References Cited

U.S. PATENT DOCUMENTS

2011/0026582 A1\* 2/2011 Bauza ................. G06T 3/4007
  375/240.02
2011/0314231 A1 12/2011 O'Connor
2012/0320067 A1 12/2012 Iourcha et al.
2013/0318197 A1 11/2013 Plaisted et al.
2014/0192075 A1 7/2014 Stamoulis et al.
2014/0314139 A1\* 10/2014 Xia .................... H04N 19/115
  375/240.02

OTHER PUBLICATIONS

Search Report and Office Action received for Taiwanese Patent Application No. 104118788, mailed Sep. 1, 2016, 7 pages including 1 page English translation.

\* cited by examiner

*FIG. 7*

Storage Medium 700

Computer Executable Instructions for 300

Computer Executable Instructions for 400

Computer Executable Instructions for 500

Computer Executable Instructions for 600

FIG. 9
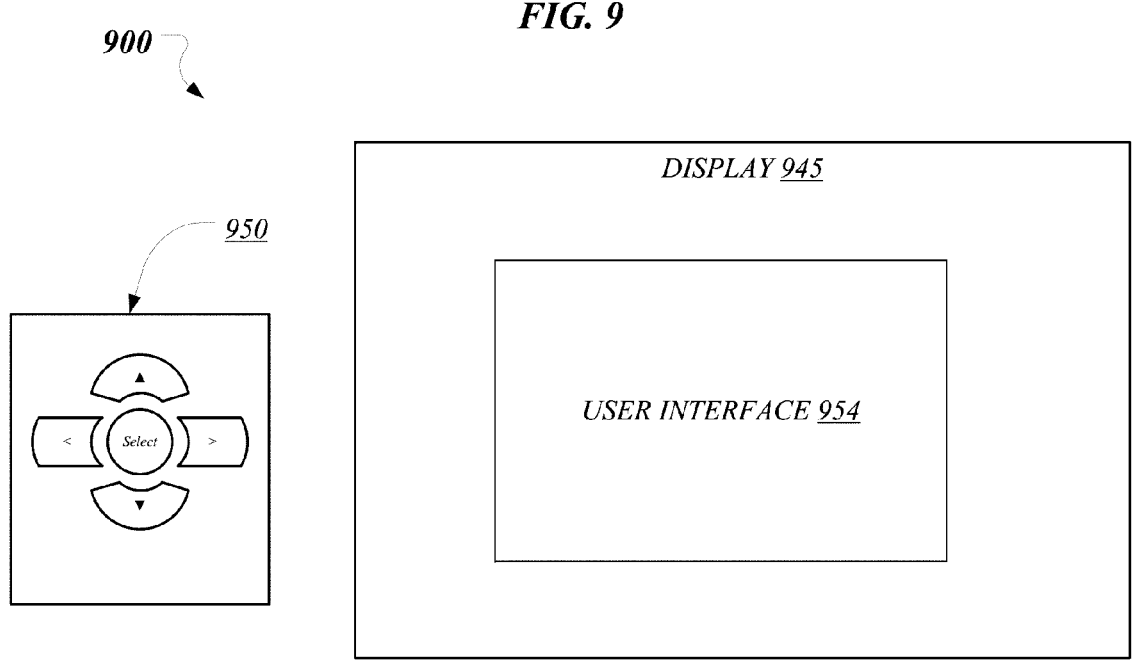
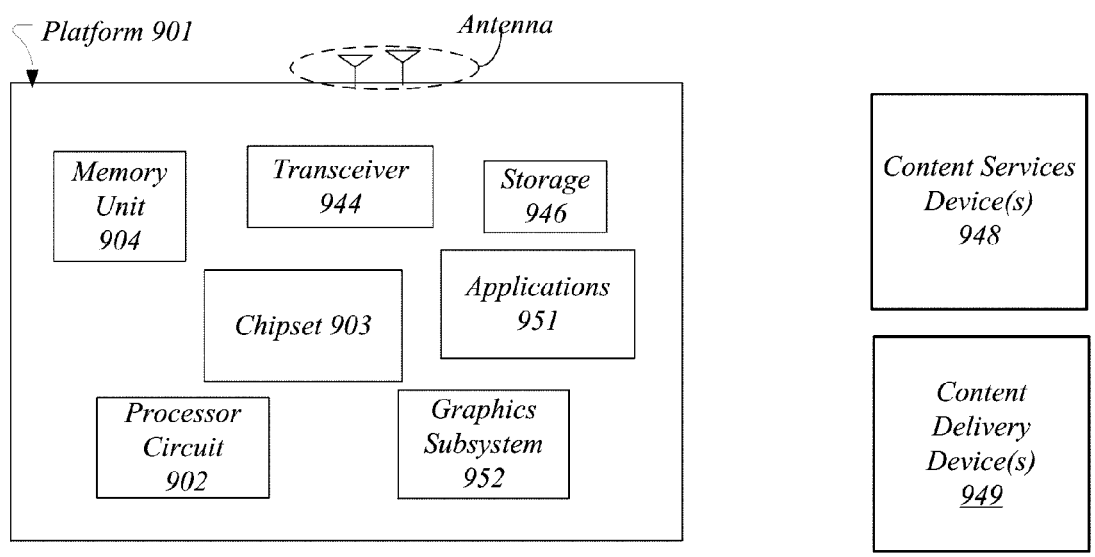
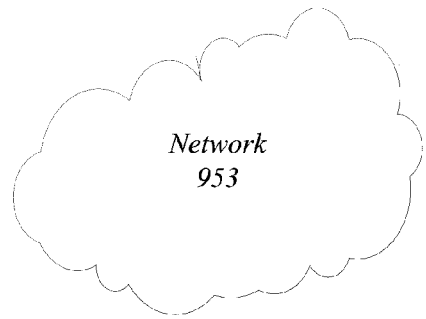

COMPRESSION TECHNIQUES FOR DYNAMICALLY-GENERATED GRAPHICS RESOURCES

BACKGROUND

A process for generating a frame of three-dimensional (3D) graphics content on a computing device typically involves many intermediate operations, also referred to as "passes," that are executed by logic circuitry such as a graphics processing unit (GPU). Each of these intermediate operations typically reads and/or writes one or more graphics resources to and/or from memory. These graphics resources are then accessed from memory and used during subsequent operations. This approach of repeatedly reading and writing graphics resources to memory may result in significant bandwidth demands on that memory. The inability of memory to accommodate such bandwidth demands is frequently a limiting factor with respect to the performance of GPUs and other graphics processing devices. In order to reduce the memory bandwidth demands associated with a 3D graphics process, graphics resources associated with that process may be compressed prior to being stored in memory. However, according to conventional techniques, compression is applied only to static, pre-generated resources, particular resource classes, and/or certain stages of the rendering pipeline.

BRIEF DESCRIPTION OF THE DRAWINGS

FIG. 7 illustrates an embodiment of a storage medium.
FIG. 9 illustrates an embodiment of a third system.

DETAILED DESCRIPTION

Various embodiments may be generally directed to compression techniques for dynamically-generated graphics resources. In one embodiment, for example, an apparatus may comprise logic, at least a portion of which is in hardware, the logic to determine one or more usage characteristics of a dynamically-generated graphics resource, determine whether to compress the dynamically-generated graphics resource based on the one or more usage characteristics, and in response to a determination to compress the dynamically-generated graphics resource, select a compression procedure based on a graphics quality threshold for the dynamically-generated graphics resource. Other embodiments are described and claimed.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrases "in one embodiment," "in some embodiments," and "in various embodiments" in various places in the specification are not necessarily all referring to the same embodiment.

Figure 1:
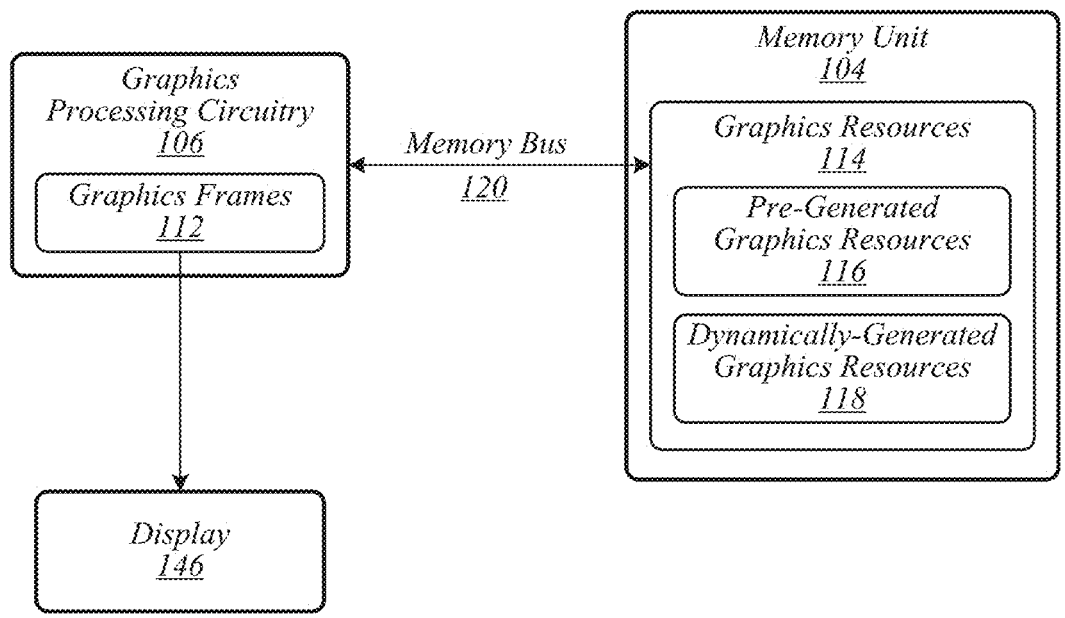
FIG. 1 illustrates an embodiment of an operating environment.

FIG. 1 illustrates an example operating environment 100 such as may be representative of various embodiments. As shown in FIG. 1, operating environment 100 comprises a memory unit 104, graphics processing circuitry 106, and a display 146. In some embodiments, graphics processing circuitry 106 may comprise a graphics processing unit (GPU). In order to present graphics content on display 146, graphics processing circuitry 106 generates graphics frames 112. In various embodiments, the graphics content may comprise 3D content that depicts three spatial dimensions using a two-dimensional (2D) arrangement of pixels. In some such embodiments, some or all of the graphics frames 112 may comprise 2D raster representations of 3D scenes. In conjunction with generating graphics frames 112, graphics processing circuitry 106 repeatedly writes and retrieves graphics resources 114 to and from memory unit 104, over a memory bus 120. Some of those graphics resources 114 comprise static, pre-generated graphics resources 116 that are defined prior to runtime of their associated application. Others among those graphics resources 114 comprise dynamically-generated graphics resources 118, that are generated during execution of the associated application. It is worthy of note that FIG. 1 is not intended to depict a comprehensive representation of all of the components of any graphics processing architecture. Rather, FIG. 1 comprises a simplified depiction, according to which some components that may be comprised in any particular graphics processing architecture associated with operating environment 100 are omitted in the interest of simplicity and clarity. It is to be understood that the embodiments are not limited to this simplified depiction.

In various embodiments, the rate at which graphics processing circuitry 106 may write and/or retrieve graphics resources 114 to and/or from memory unit 104 may be limited by the bandwidth of memory bus 120 and/or one or more other characteristics of memory bus 120. In turn, this may limit the rate at which graphics processing circuitry 106 can generate graphics frames 112. If graphics processing circuitry 106 is unable to generate graphics frames 112 at a sufficient rate, the quality of the graphics content presented on display 146 may be degraded. As such, it may be desirable to reduce the bandwidth demands associated with writing/retrieving graphics resources 114 to/from memory unit 104.

One approach that is utilized in some conventional systems involves compressing some graphics resources prior to storing them in memory. However, in conventional systems, compression is applied only to static graphics resources such as pre-generated graphics resources 116, to particular resources classes, and/or to certain stages of the rendering pipeline. Thus, conventional approaches fail to make use of memory bandwidth consumption reductions that may potentially be obtained by applying compression to dynamically-generated graphics resources, such as dynamically-generated graphics resources 118.

Disclosed herein are compression techniques for dynamically-generated graphics resources, such as may be implemented in some embodiments in order to reduce the memory bandwidth demands of a graphics application. According to various such techniques, a determination of whether and/or how to compress a given dynamically-generated graphics resource may be based at least in part on how frequently that dynamically-generated graphics resource is used and/or on the extent, if any, to which some degree of the quality of that dynamically-generated graphics resource may be sacrificed in order to reduce its size. According to the techniques described herein, compression may be applied to dynamically-generated graphics resources of arbitrary formats, bit depths, and tile layouts. In some embodiments, the disclosed techniques may be applied to dynamically-generated graphics resources generated in and/or associated with one or more stages of a rendering pipeline for 3D graphics content. In various other embodiments, the disclosed techniques may be applied to dynamically-generated graphics resources associated with other types of graphics processes. The embodiments are not limited in this context.

Figure 2:
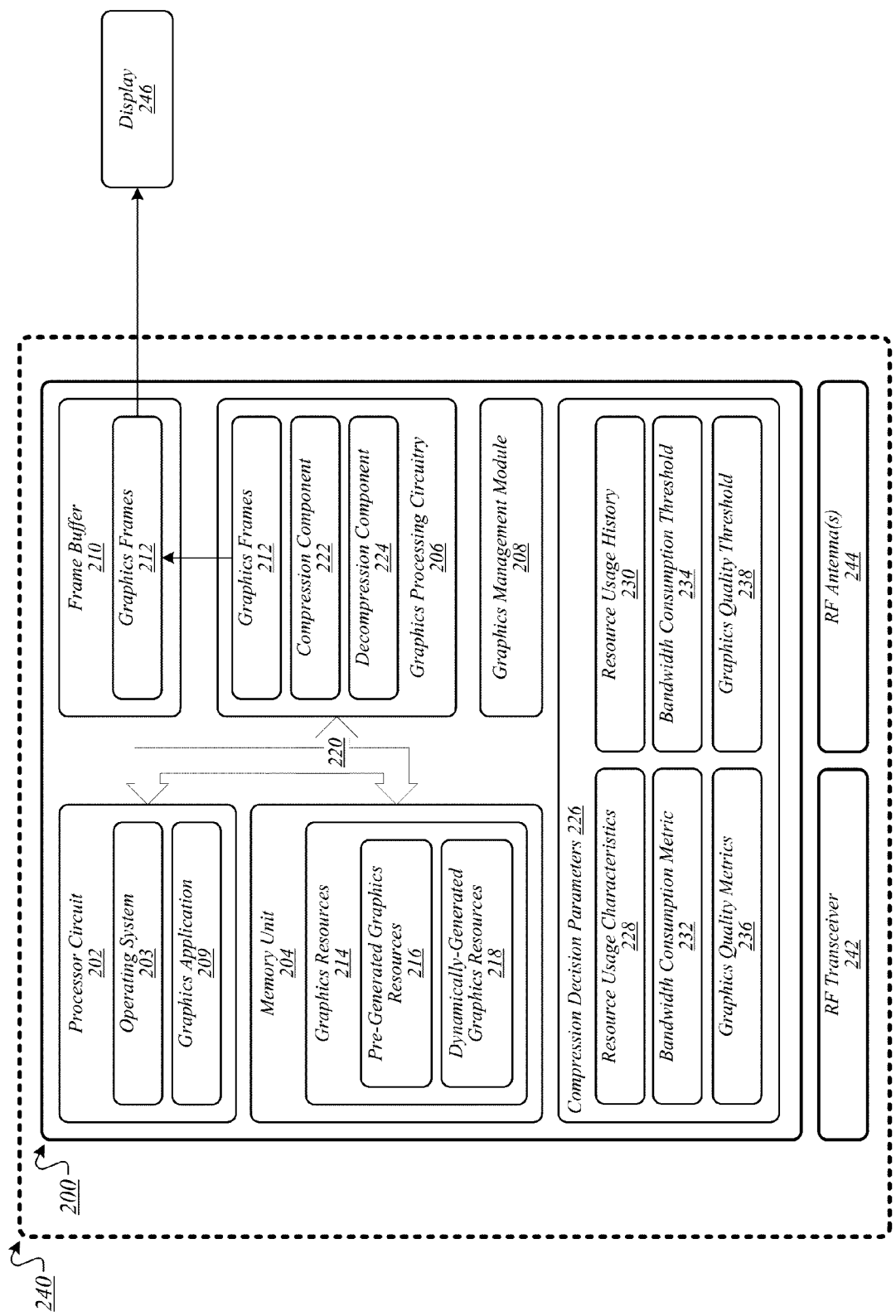
FIG. 2 illustrates an embodiment of an apparatus and an embodiment of a first system.

FIG. 2 illustrates a block diagram of an apparatus 200. As shown in FIG. 2, apparatus 200 comprises multiple elements including a processor circuit 202, a memory unit 204, graphics processing circuitry 206, and a graphics management module 208. The embodiments, however, are not limited to the type, number, or arrangement of elements shown in this figure.

In some embodiments, apparatus 200 may comprise processor circuit 202. Processor circuit 202 may be implemented using any processor or logic device, such as a complex instruction set computer (CISC) microprocessor, a reduced instruction set computing (RISC) microprocessor, a very long instruction word (VLIW) microprocessor, an x86 instruction set compatible processor, a processor implementing a combination of instruction sets, a multi-core processor such as a dual-core processor or dual-core mobile processor, or any other microprocessor or central processing unit (CPU). Processor circuit 202 may also be implemented as a dedicated processor, such as a controller, a microcontroller, an embedded processor, a chip multiprocessor (CMP), a co-processor, a digital signal processor (DSP), a network processor, a media processor, an input/output (I/O) processor, a media access control (MAC) processor, a radio baseband processor, an application specific integrated circuit (ASIC), a field programmable gate array (FPGA), a programmable logic device (PLD), and so forth. In one embodiment, for example, processor circuit 202 may be implemented as a general purpose processor, such as a processor made by Intel® Corporation, Santa Clara, Calif. The embodiments are not limited in this context.

In various embodiments, processor circuit 202 may be operative to execute an operating system 203. Operating system 203 may contain, communicate, generate, obtain, and provide program component, system, user, and data communications, requests, and responses, and may be operative to facilitate interaction with and/or interaction between various hardware and/or software components, such as communications networks, network interfaces, data, I/O, peripheral devices, storage devices, program components, memory devices, user input devices, and the like. In some embodiments, operating system 203 may comprise programming logic operative to utilize and/or control one or more hardware and/or software elements of apparatus 200. The embodiments are not limited in this context.

In various embodiments, apparatus 200 may comprise or be arranged to communicatively couple with a memory unit 204. Memory unit 204 may be implemented using any machine-readable or computer-readable media capable of storing data, including both volatile and non-volatile memory. For example, memory unit 204 may include read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. It is worthy of note that some portion or all of memory unit 204 may be included on the same integrated circuit as processor circuit 202, or alternatively some portion or all of memory unit 204 may be disposed on an integrated circuit or other medium, for example a hard disk drive, that is external to the integrated circuit of processor circuit 202. Although memory unit 204 is comprised within apparatus 200 in FIG. 2, memory unit 204 may be external to apparatus 200 in some embodiments. The embodiments are not limited in this context.

In some embodiments, apparatus 200 may comprise graphics processing circuitry 206. Graphics processing circuitry 206 may comprise circuitry arranged to perform graphics processing calculations and/or operations on behalf of apparatus 200. In various embodiments, graphics processing circuitry 206 may be operative to generate graphics frames for storage in one or more frame buffers used to present graphics on one or more displays. In some embodiments, graphics processing circuitry 206 may comprise a graphics processing unit (GPU). In various embodiments, graphics processing circuitry 206 may comprise integrated graphics circuitry within processor circuit 202. The embodiments are not limited in this context.

In some embodiments, apparatus 200 may comprise a graphics management module 208. Graphics management module 208 may comprise logic, circuitry, and/or instructions operative to manage and/or control graphic processing circuitry 206. In various embodiments, graphics management module 208 may comprise a driver for graphics processing circuitry 206. In some embodiments, graphics management module 208 may comprise programming logic that enables operating system 203 to utilize and/or control graphics processing circuitry 206. The embodiments are not limited in this context.

FIG. 2 also illustrates a block diagram of a system 240. System 240 may comprise any of the aforementioned elements of apparatus 200. System 240 may further comprise a radio frequency (RF) transceiver 242. RF transceiver 242 may comprise one or more radios capable of transmitting and receiving signals using various suitable wireless communications techniques. Such techniques may involve communications across one or more wireless networks. Exemplary wireless networks include (but are not limited to) cellular radio access networks, wireless local area networks (WLANs), wireless personal area networks (WPANs), wireless metropolitan area network (WMANs), and satellite networks. In communicating across such networks, RF transceiver 242 may operate in accordance with one or more applicable standards in any version. The embodiments are not limited in this context.

In various embodiments, system 240 may comprise one or more RF antennas 244. Examples of any particular RF antenna 244 may include, without limitation, an internal antenna, an omni-directional antenna, a monopole antenna, a dipole antenna, an end-fed antenna, a circularly polarized antenna, a micro-strip antenna, a diversity antenna, a dual antenna, a tri-band antenna, a quad-band antenna, and so forth. In some embodiments, RF transceiver 242 may be operative to send and/or receive messages and/or data using one or more RF antennas 244. The embodiments are not limited in this context.

During general operation of apparatus 200 and/or system 240, processor circuit 202 may be operative to execute a graphics application 209. Graphics application 209 may comprise any application featuring graphics generation capabilities, such as, for example, an image or video viewing application, an image or video playback application, a streaming video playback application, a multimedia application program, a system program, a conferencing application, a gaming application, a productivity application, a messaging application, an instant messaging (IM) application, an electronic mail (email) application, a short messaging service (SMS) application, a multimedia messaging service (MMS) application, a social networking application, a web browsing application, and so forth. In various embodiments, graphics application 209 may comprise a three-dimensional (3D) graphics application that features one or more 3D graphics generation capabilities. The embodiments are not limited in this context.

In some embodiments, during execution, graphics application 209 may generally be operative to cause graphics processing circuitry 206 to recurrently populate a frame buffer 210 with graphics frames 212. From the frame buffer 210, the graphics frames 212 may be recurrently driven to a display 246 to cause graphics content to be presented on the display 246. Examples of the display 246 may include a television, a monitor, a projector, and a computer screen. In one embodiment, for example, display 246 may be implemented by a liquid crystal display (LCD), light emitting diode (LED) or other type of suitable visual interface. Display 246 may comprise, for example, a touch-sensitive display screen ("touchscreen"). In various implementations, display 246 may comprise one or more thin-film transistors (TFT) LCD including embedded transistors. The embodiments, however, are not limited to these examples. It is worthy of note that although display 246 is depicted in FIG. 2 as being external to apparatus 200 and system 240, display 246 may be comprised within apparatus 200 and/or system 240 in some embodiments. The embodiments are not limited in this context.

In various embodiments, graphics processing circuitry 206 may be operative to generate any particular graphics frame 212 according to a frame generation process that comprises a series of passes. In some embodiments, during some or all of these passes, graphics processing circuitry 206 may be operative to read and/or write one or more graphics resources 214 to and/or from memory to which it has access. In various embodiments, for example, graphics processing circuitry 206 may be operative to read and/or write one or more graphics resources 214 to and/or from memory unit 204. In the interest of simplicity, the discussion that follows assumes this particular example arrangement. However, it is to be understood that in some other embodiments, graphics processing circuitry 206 may be operative to read and/or write one or more graphics resources 214 to and/or from memory other than memory unit 204. For example, in various embodiments, graphics processing circuitry 206 may be operative to read and/or write one or more graphics resources 214 to and/or from dedicated graphics memory that is external to memory unit 204. The embodiments are not limited in this context.

In some embodiments, each graphics resource 214 may comprise graphics information for use in generating one or more graphics frames 212. Examples of graphics resources 214 may include, without limitation, textures, intermediate render targets, shapes, pictures, images, frames, bitmaps, patterns, and/or other types of graphics information. In various embodiments, graphics resources 214 may comprise one or more pre-generated graphics resources 216. Each pre-generated graphics resource 216 may comprise a graphics resource that has already been defined and/or composed at the time at which graphics application 209 begins execution. In some embodiments, one or more of pre-generated graphics resources 216 may comprise graphics resources defined and/or composed during design and/or development of graphics application 209. In various embodiments, graphics application 209 may be operative to store one or more pre-generated graphics resources 216 in memory unit 204 during an initial phase of execution of graphics application 209. The embodiments are not limited in this context.

In some embodiments, graphics resources 214 may comprise one or more dynamically-generated graphics resources 218. Each dynamically-generated graphics resource 218 may comprise a graphics resource that is generated during ongoing execution of graphics application 209, and that is thus not defined prior to execution of graphics application 209. In various embodiments, graphics processing circuitry 206 may be operative to generate one or more dynamically-generated graphics resources 218 and store them in memory unit 204. In some embodiments, each time graphics processing circuitry 206 generates a dynamically-generated graphics resource 218, it may read one or more graphics resources 214 from memory unit 204 and generate the dynamically-generated graphics resource 218 based on those one or more graphics resources 214. In various embodiments, the graphics resources 214 that graphics processing circuitry 206 retrieves and uses to generate any particular dynamically-generated graphics resource 218 may include one or more other dynamically-generated graphics resources 218. For example, in some embodiments, during a given pass of a frame generation process, graphics processing circuitry 206 may be operative to generate one or more dynamically-generated graphics resources 218 based on one or more dynamically-generated graphics resources 218 that were generated and stored during one or more previous passes of the frame generation process. The newly-generated dynamically-generated graphics resources 218 may then themselves be written to memory unit 204, from which they may be read for use during one or more subsequent passes of the frame generation process. The embodiments are not limited in this context.

In various embodiments, graphics processing circuitry 206 may be operative to access memory unit 204 via a memory bus 220. In some embodiments, the rate at which graphics processing circuitry 206 can read and/or write graphics resources 214 to and/or from memory unit 204 at any point in time may be limited by an available bandwidth of memory bus 220. In various embodiments, the larger that the graphics resources 214 in memory unit 204 are, the larger the bandwidth consumption associated with reading and/or writing those graphics resources 214 may be. If the bandwidth demands associated with access to graphics resources 214 over memory bus 220 cannot be accommodated, graphics processing circuitry 206 may be unable to generate graphics frames 212 at a rate that is sufficient to produce a satisfactory level of quality with respect to the graphics content that is presented on display 246. The embodiments are not limited in this context.

In some embodiments, the degree to which any given graphics resource 214 constitutes a burden with respect to throughput on memory bus 220 may depend the usage characteristics of that resource as well as its size. For example, a very large graphics resource 214 may not constitute a particularly significant memory bandwidth consumer if it is only read from memory unit 204 one time over the course of a frame generation process. Likewise, a relatively small graphics resource 214 may constitute a very significant memory bandwidth consumer if it is read from memory unit 204 very frequently during a frame generation process. The embodiments are not limited in this context.

In various embodiments, graphics processing circuitry 206 may comprise a compression component 222. Compression component 222 may comprise logic, circuitry, and or instructions operative to compress one or more graphics resources 214. More particularly, in some embodiments, compression component 222 may be operative to compress one or more graphics resources 214 prior to their storage in memory unit 204. In various embodiments, one or more graphics resources 214 that compression component 222 is operative to compress may include one or more pre-generated graphics resources 216 and/or one or more dynamically-generated graphics resources 218. In some embodiments, compression component 222 may comprise one or more shaders that compress to one or more respective compressed texture formats. In various embodiments, compression capabilities of compression component 222 may be accessible via one or more application programming interface (API) commands. In some embodiments, one or more such API commands may comprise 3D API commands. In various embodiments, one or more such API commands may enable GPU device driver-based control of one or more hardware-implemented and/or optimized shader-implemented compression agents that are transparent to graphics application 209. The embodiments are not limited in this context.

In some embodiments, graphics processing circuitry 206 may comprise a decompression component 224. Decompression component 224 may comprise logic, circuitry, and/or instructions operative to decompress one or more compressed graphics resources 214. More particularly, in various embodiments, decompression component 224 may be operative to decompress one or more compressed graphics resources 214 following their retrieval from memory unit 204. In some embodiments, one or more graphics resources 214 that decompression component 224 is operative to decompress may include one or more compressed pre-generated graphics resources 216 and/or one or more compressed dynamically-generated graphics resources 218. In various embodiments, decompression component 224 may comprise texture sampling logic, circuitry, and/or instructions corresponding to one or more compressed texture formats utilized by compression component 222. It is worthy of note that in some embodiments, some or all of compressed graphics resources 214 may be sampled natively in their compressed formats, and thus may not be decompressed by decompression component 224. The embodiments are not limited in this context.

In some embodiments, when graphics application 209 is launched, it may be operative to store one or more pre-generated graphics resources 216 in memory unit 204. In various embodiments, graphics application 209 may additionally or alternatively be operative to store one or more pre-generated graphics resources 216 in memory unit 204 during ongoing execution. In some embodiments, graphics application 209 may be operative to store one or more such pre-generated graphics resources 216 in an uncompressed format. In various embodiments, graphics application 209 may additionally or alternatively be operative to store one or more such pre-generated graphics resources 216 in memory unit 204 in one or more compressed formats. In some embodiments, one or more pre-generated graphics resources 216 may already have been compressed in conjunction with their pre-generation, and graphics application 209 may be operative to write those compressed pre-generated graphics resources 216 directly to memory unit 204. In various embodiments, graphics application 209 may be operative to send one or more pre-generated graphics resources 216 to compression component 222 for compression according to one or more pre-determined compression formats prior to their storage in memory unit 204. The embodiments are not limited in this context.

In some embodiments, graphics application 209 may generally be operative during execution to present graphics content on display 246 by causing frame buffer 210 to be recurrently populated with graphics frames 212. In various embodiments, any particular graphics frame 212 may be generated as the cumulative result of a series of passes of a frame generation process. In some embodiments, during any particular pass of a frame generation process for a given graphics frame 212, graphics processing circuitry 206 may be operative to generate one or more dynamically-generated graphics resources 218. In various embodiments, graphics processing circuitry 206 may be operative to generate any particular dynamically-generated graphics resource 218 based on one or more pre-generated graphics resources 216 and/or one or more other dynamically-generated graphics resources 218. In some embodiments, graphics processing circuitry 206 may be operative to retrieve the one or more pre-generated graphics resources 216 and/or one or more other dynamically-generated graphics resources 218 from memory unit 204 via memory bus 220. The embodiments are not limited in this context.

In various embodiments, one or more dynamically-generated graphics resources 218 that comprise outputs of a given pass of the frame generation process may constitute inputs for one or more subsequent passes and/or inputs for the generation processes for one or more subsequent frames. In some embodiments, graphics processing circuitry 206 may be operative to store such dynamically-generated graphics resources 218 in memory unit 204 for retrieval during those one or more subsequent passes and/or subsequent generation processes. In various embodiments, the larger those dynamically-generated graphics resources 218, the greater the memory bandwidth consumption associated with their storage and/or subsequent retrieval may be. In some embodiments, in order to reduce the overall memory bandwidth demands of the generation process or processes for one or more graphics frames 212, it may be desirable for compression component 222 to compress one or more dynamically-generated graphics resources 218 that are generated during the generation process(es). The embodiments are not limited in this context.

In various embodiments, compression component 222 may be capable of implementing one or more lossy compression algorithms. In some embodiments, one or more such lossy compression algorithms may comprise texture compression algorithms. In various embodiments, one or more such lossy compression algorithms may comprise block-based compression algorithms. Examples of lossy compression algorithms of which compression component 222 may be capable of implementing in some embodiments may include, without limitation, adaptive scalable texture compression (ASTC) and block compression (BC) according to formats such as BC1/DXT1, BC2/DXT3, BC3/DXT5, BC4, BC5, BC6, and/or BC7. In various embodiments, applying any given lossy compression algorithm to a dynamically-generated graphics resource 218 may involve a tradeoff of some amount of graphics quality associated with the dynamically-generated graphics resource 218 in exchange for a reduction in the amount of storage space occupied the dynamically-generated graphics resource 218. For example, with respect to a given dynamically-generated graphics resource 218 that has been lossily compressed and stored in memory unit 204, the product obtained by decompression may be a version of the dynamically-generated graphics resource 218 that features a lesser resolution, bit-depth, and/or other measure of quality in comparison to the original, uncompressed version of that dynamically-generated graphics resource 218. Generally speaking, a more compressive lossy compression algorithm may yield a greater size reduction, but may sacrifice more graphics quality. Likewise, a less compressive lossy compression algorithm may better preserve graphics quality, but may yield less of a reduction in size. The embodiments are not limited in this context.

In some embodiments, compression component 222 may also be capable of implementing one or more lossless compression algorithms. Examples of lossless compression algorithms of which compression component 222 may be capable of implementing in various embodiments may include, without limitation, OpenCTM, Lempel-Ziv-Welch (LZW), Deflate, discrete cosine transform (DCT)-based encoding, International Telegraph and Telephone Consultative Committee (CCITT) T.4 bi-level encoding, and CCITT T.6 bi-level encoding. Although the application of a lossless compression algorithm may not sacrifice the graphics quality of a dynamically-generated graphics resource 218, it may still involve a tradeoff of some amount of the available processing throughput of graphics processing circuitry 206 in exchange for a reduction in the size of the dynamically-generated graphics resource 218. It is worthy of note that with respect to applying any particular lossless compression algorithm to any particular dynamically-generated graphics resource 218, not only may there be graphics processing throughput costs associated with performing the compression, but there also may be graphics processing throughput costs associated with performing the corresponding decompression when the compressed resource is subsequently retrieved from memory. It is worthy of note that such a graphics processing throughput/size reduction tradeoff may be involved in the application of any particular lossy compression algorithm, as well as in the application of any particular lossless compression algorithm. The embodiments are not limited in this context.

In some embodiments, upon generation and/or use of a given dynamically-generated graphics resource 218, it may be determined whether that dynamically-generated graphics resource 218 is to be compressed. In various embodiments, this determination may be performed by graphics application 209. In some other embodiments, this determination may be performed by graphics management module 208 or compression component 222. In yet other embodiments, this determination may be performed by another component of apparatus 200 and/or system 240. In still other embodiments, this determination may be jointly performed by two or more of any of the aforementioned elements. In order to simplify the discussion that follows, the term "compression decision logic" shall be used as a blanket term to refer, with respect to any particular determination, to the entity or entities that perform a given determination or other operation in conjunction with the disclosed compression techniques for dynamically-generated graphics resources. It is to be understood that unless otherwise stated, any particular determination or other operation that is described as being performed by the "compression decision logic" may be performed by any of the elements or combinations of elements discussed above. It is further to be understood that although examples may be provided in which particular elements perform particular determinations or other operations, these examples are not intended to limit the scope of the term "compression decision logic" with respect to the context to which they apply.

In various embodiments, the compression decision logic may be operative to generate, determine, store, analyze, compare, and/or otherwise utilize one or more parameters in conjunction with performing determinations and/or other operations in conjunction with the disclosed compression techniques for dynamically-generated graphics resources. Any particular such parameter may be generated, determined, stored, analyzed, compared, and/or otherwise utilized by any one or more components of the compression decision logic in any particular embodiment. As such, FIG. 2 depicts examples of such parameters, which are discussed below, as being comprised in a separate compression decision parameters 226 block in FIG. 2. It is to be appreciated that this depiction is intended merely to convey the flexibility associated with selection of the components that may generate, determine, store, analyze, compare, and/or otherwise utilize these example parameters in some embodiments, and is not intended to indicate that these example parameters need necessarily be generated, determined, stored, analyzed, compared, and/or otherwise utilized by a same component. The embodiments are not limited in this context.

In various embodiments, the compression decision logic may be operative to determine one or more resource usage characteristics 228 of any given dynamically-generated graphics resource 218. In some embodiments, the one or more resource usage characteristics 228 may comprise one or more indications and/or estimations of how frequently the dynamically-generated graphics resource 218 will traverse memory bus 220 during the remainder of the frame generation process or processes for one or more graphics frames 212. In various embodiments, the compression decision logic may be operative to determine one or more resource usage characteristics 228 of the dynamically-generated graphics resource 218 based on a type of graphics resource that the dynamically-generated graphics resource 218 comprises. In some embodiments, the compression decision logic may be operative to determine one or more resource usage characteristics 228 of the dynamically-generated graphics resource 218 based on resource usage history 230. Resource usage history 230 may comprise information describing how frequently one or more dynamically-generated graphics resources 218 have been used during one or more previous passes and/or during generation processes for one or more preceding graphics frames 212. In various embodiments, the compression decision logic may be operative to create, maintain, and/or update resource usage history 230 on an ongoing basis in conjunction with the generation of a series of graphics frames 212. The embodiments are not limited in this context.

In an example embodiment, during a given pass of a generation process for a given graphics frame 212, the compression decision logic may be operative to determine one or more resource usage characteristics 228 for a dynamically-generated graphics resource 218 based on resource usage history 230 indicating how frequently the dynamically-generated graphics resource 218 and/or resources of a same type traversed memory bus 220 during the preceding passes of the generation process and/or during generation processes for one or more preceding graphics frames 212. In such an example embodiment, the one or more generated resource usage characteristics 228 may comprise an indication or estimation of how frequently the dynamically-generated graphics resource 218 will traverse memory bus 220 during the remainder of the generation process for that graphics frame 212 and/or during generation processes for one or more subsequent graphics frames 212. The embodiments are not limited to this example.

In some embodiments, the compression decision logic may be operative to determine whether to compress any particular dynamically-generated graphics resource 218 based on one or more resource usage characteristics 228 for that dynamically-generated graphics resource 218. In various embodiments, the compression decision logic may be operative to determine a bandwidth consumption metric 232 for the dynamically-generated graphics resource 218 based on the one or more resource usage characteristics 228, and may be operative to determine whether to compress the dynamically-generated graphics resource 218 based on the bandwidth consumption metric 232. In some embodiments, the bandwidth consumption metric 232 may generally comprise an indication of an overall extent to which the dynamically-generated graphics resource 218 is expected to consume bandwidth of memory bus 220 over the course of one or more subsequent passes and/or the generation processes for one or more subsequent graphics frames 212. The embodiments are not limited in this context.

In various embodiments, the compression decision logic may be operative to determine the bandwidth consumption metric 232 for a given dynamically-generated graphics resource 218 based on one or more resource usage characteristics 228 and on the size of the dynamically-generated graphics resource 218. For example, in some embodiments, the compression decision logic may be operative to determine the bandwidth consumption metric 232 by multiplying the size of the dynamically-generated graphics resource 218 by an estimated number of times that the dynamically-generated graphics resource 218 is expected to traverse the memory bus 220 during the remaining passes of the frame generation process. In various embodiments, the compression decision logic may be operative to determine whether to compress the dynamically-generated graphics resource 218 by comparing the bandwidth consumption metric 232 to one or more thresholds. For example, in some embodiments, the compression decision logic may be operative to determine not to compress the dynamically-generated graphics resource 218 if its corresponding bandwidth consumption metric 232 is less than a defined bandwidth consumption threshold 234. In various embodiments, if the bandwidth consumption metric 232 is greater than the bandwidth consumption threshold 234, the compression decision logic may be operative to determine to compress the dynamically-generated graphics resource 218, or may identify the dynamically-generated graphics resource 218 as a compression candidate to be further considered. In some embodiments, the value of the bandwidth consumption threshold 234 may be specific to the type of graphics resource that the dynamically-generated graphics resource 218 comprises. The embodiments are not limited in this context.

In various embodiments, the compression decision logic may be operative to determine a graphics quality metric 236 for the uncompressed version of any particular dynamically-generated graphics resource 218. In some embodiments, this graphics quality metric 236 may generally comprise an indicator of a relative level of quality of the uncompressed dynamically-generated graphics resource 218. In various embodiments, this graphics quality metric 236 may be determined as a function of one or more characteristics of the uncompressed dynamically-generated graphics resource 218, such as a resolution, bit-depth, format, and/or resource type of the dynamically-generated graphics resource 218. In some embodiments, the compression decision logic may be operative to determine whether to compress the dynamically-generated graphics resource 218 by comparing this graphics quality metric 236 to a graphics quality threshold 238 for the dynamically-generated graphics resource 218. In various embodiments, the graphics quality threshold 238 for the dynamically-generated graphics resource 218 comprise a graphics quality metric value that defines an acceptable level of quality for the dynamically-generated graphics resource 218. In some embodiments, the compression decision logic may be operative to determine not to compress the dynamically-generated graphics resource 218 if the graphics quality metric 236 corresponding to its uncompressed form is not greater than the graphics quality threshold 238. In various embodiments, if the graphics quality metric 236 corresponding to the uncompressed dynamically-generated graphics resource 218 is greater than the graphics quality threshold 238, the compression decision logic may be operative to determine to compress the dynamically-generated graphics resource 218, or may identify the dynamically-generated graphics resource 218 as a compression candidate to be further considered. The embodiments are not limited in this context.

In some embodiments, the compression decision logic may be arranged to perform compression decisions based both on bandwidth consumption metrics 232 and on graphics quality metrics 236. In various embodiments, in order to determine whether to compress a given dynamically-generated graphics resource 218, the compression decision logic may first be operative to compare the bandwidth consumption metric 232 for that dynamically-generated graphics resource 218 to the bandwidth consumption threshold 234. In some embodiments, if the bandwidth consumption metric 232 is less than the bandwidth consumption threshold 234, the compression decision logic may be operative to determine not to compress the dynamically-generated graphics resource 218, and may not calculate a graphics quality metric 236 for the dynamically-generated graphics resource 218. On the other hand, if the bandwidth consumption metric 232 is greater than the bandwidth consumption threshold 234, the compression decision logic may be operative to calculate a graphics quality metric 236 for the dynamically-generated graphics resource 218 and may determine whether to compress the dynamically-generated graphics resource 218 by comparing the graphics quality metric 236 to a graphics quality threshold 238. However, it is to be appreciated that the embodiments are not limited to this example. In various other embodiments, the initial consideration may comprise a comparison between the graphics quality metric 236 and the graphics quality threshold 238, and the determination of the bandwidth consumption metric 232 may be contingent on the result of this comparison. Furthermore, in some embodiments, the compression decision logic may use one or more additional and/or alternate parameters and/or comparisons in order to determine whether to compress any particular dynamically-generated graphics resource 218 or whether to further consider any particular dynamically-generated graphics resource 218 as a compression candidate. The embodiments are not limited in this context.

In various embodiments, in response to a determination to compress a dynamically-generated graphics resource 218, the compression decision logic may be operative to select a compression procedure according to which the compression is to be performed. In some embodiments, the compression decision logic may be operative to select the compression procedure for the dynamically-generated graphics resource 218 based on the graphics quality threshold 238 for the dynamically-generated graphics resource 218. In various embodiments, the compression decision logic may be operative to select the compression procedure from among a plurality of compression procedures that compression component 222 is capable of implementing. In some embodiments, each such compression procedure may correspond to a respective compression algorithm. In various embodiments, the plurality of compression procedures may include one or more compression procedures corresponding to lossy compression algorithms. In some embodiments, the plurality of compression procedures may additionally or alternatively include one or more compression procedures corresponding to lossless compression algorithms. The embodiments are not limited in this context.

In various embodiments, the compression decision logic may generally base its selection of a compression procedure for a given dynamically-generated graphics resource 218 upon a degree to which quality may acceptably be sacrificed in conjunction with compression of that dynamically-generated graphics resource 218. Generally speaking, the greater the degree to which quality may acceptably be sacrificed, the more compressive an algorithm the compression decision logic may select. In some embodiments, with respect to a given dynamically-generated graphics resource 218, the compression decision logic may be operative to determine or estimate an amount of quality that may acceptably be sacrificed based on the graphics quality threshold 238 for that dynamically-generated graphics resource 218. In various embodiments, for example, the compression decision logic may be operative to determine or estimate the amount of quality that may acceptably be sacrificed by comparing the graphics quality threshold 238 for the dynamically-generated graphics resource 218 to the graphics quality metric 236 corresponding to its uncompressed form. In such example embodiments, the extent to which the graphics quality metric 236 is greater than the graphics quality threshold 238 may generally indicate the amount of quality that may acceptably be sacrificed with respect to that dynamically-generated graphics resource 218. The embodiments are not limited to this example.

In some embodiments, in order to consider any particular compression procedure as a candidate for application to a given dynamically-generated graphics resource 218, the compression decision logic may be operative to determine a degree of quality reduction associated with application of that candidate compression procedure to that dynamically-generated graphics resource 218. In various embodiments, this degree of quality reduction may generally comprise a difference between the level of quality of the original, uncompressed version of the dynamically-generated graphics resource 218 and a version of the dynamically-generated graphics resource 218 that is obtained by compressing and decompressing the original version according to the compression algorithm associated with the candidate compression procedure. In some embodiments, the compression decision logic may be operative to determine this degree of quality reduction by determining a graphics quality metric 236 for the compressed and decompressed version of the dynamically-generated graphics resource 218. In various such embodiments, the compression decision logic may be operative to determine the degree of quality reduction by comparing the graphics quality metric 236 for the compressed and decompressed version of the dynamically-generated graphics resource 218 to the graphics quality metric 236 for the original, uncompressed version. It is worthy of note that in some embodiments, with respect to a candidate compression procedure that involves the application of a lossless compression algorithm, the compression decision logic may be operative to determine that there is no level of graphics quality reduction associated with the candidate procedure without determining a graphics quality metric 236 corresponding to that procedure. The embodiments are not limited in this context.

In various embodiments, the compression decision logic may be operative to identify, among a plurality of candidate compression procedures, a most compressive candidate procedure that will not result in a degree of quality reduction for a given dynamically-generated graphics resource 218 that exceeds the acceptable degree for that dynamically-generated graphics resource 218. In some embodiments, the compression decision logic may be operative to perform this determination by identifying, with respect to the dynamically-generated graphics resource 218, a most compressive candidate procedure for which the associated graphics quality metric 236 is greater than the graphics quality threshold 238. In various embodiments, the plurality of candidate compression procedures may exclusively comprise lossy compression procedures, and the compression decision logic may be operative to select a lossy compression procedure from among the plurality based on the graphics quality threshold 238 for the dynamically-generated graphics resource 218. In some other embodiments, the plurality of candidate compression procedures may include one or more lossless compression procedures as well as one or more lossy compression procedures, and the compression decision logic may be operative to select either a lossy compression procedure or a lossless compression procedure, depending on the graphics quality threshold 238 for the dynamically-generated graphics resource 218. In an example embodiment, the compression decision logic may be operative to select a lossy compression procedure if one is available that may be applied without traversing the graphics quality threshold 238, and may otherwise be operative to select a lossless compression procedure. In yet other embodiments, the plurality of candidate compression procedures may exclusively comprise lossless compression procedures, and the compression decision logic may be operative to select a lossless compression procedure from among the plurality. In various such embodiments, the compression decision logic may be operative to select a most compressive lossless compression procedure for which the associated graphics processing throughput consumption is less than a threshold. The embodiments are not limited in this context.

In some embodiments, once the compression decision logic has determined that a particular dynamically-generated graphics resource 218 is to be compressed and has selected a compression procedure, compression component 222 may be operative to compress that dynamically-generated graphics resource 218 using the selected compression procedure. Following compression, compression component 222 may be operative to store the compressed dynamically-generated graphics resource 218 in memory, such as in memory unit 204, for example. In various embodiments, a dynamically-generated graphics resource 218 that is compressed and stored during one pass may comprise an input to a subsequent pass. In some embodiments, decompression component 224 may be operative to decompress the stored dynamically-generated graphics resource 218 according to a decompression procedure that corresponds to the compression procedure used to compress that dynamically-generated graphics resource 218. The embodiments are not limited in this context.

It is worthy of note that in various embodiments, some or all of the aforementioned operations that may be involved in performing compression decisions for a given dynamically-generated graphics resource 218 may not necessarily be performed upon generation of that dynamically-generated graphics resource 218. In some embodiments, the compression decision logic may be operative to perform one or more such operations prior to generation of the dynamically-generated graphics resource 218. For example, in various embodiments, the compression decision logic may be operative to identify a graphics quality threshold 238 and one or more resource usage characteristics 228 for a dynamically-generated graphics resource 218 and use them to determine whether to compress that dynamically-generated graphics resource 218 before the dynamically-generated graphics resource 218 is generated by graphics processing circuitry 206. The embodiments are not limited to this example.

It is also worthy of note that in some embodiments, the compression decision logic may be operative to perform multiple compression decisions for a given dynamically-generated graphics resource 218. In an example embodiment, prior to or upon generation of a given dynamically-generated graphics resource 218, the compression decision logic may be operative to determine not to compress the dynamically-generated graphics resource 218 for initial storage based on an initial estimate of how frequently the dynamically-generated graphics resource 218 will traverse memory bus 220. Subsequently, the compression decision logic may be operative to reconsider whether to compress the dynamically-generated graphics resource 218 based on accumulated resource usage history 230 that enables a more accurate determination or estimation of the burden that the dynamically-generated graphics resource 218 represents with respect to the memory bus 220. If the resource usage history 230 indicates that the dynamically-generated graphics resource 218 may be expected to constitute a substantial memory bandwidth consumer going forward, the compression decision logic may determine that the dynamically-generated graphics resource 218 is to be compressed. The embodiments are not limited to this example.

It is further worthy of note that in various embodiments, the compression decision logic may be operative to utilize some or all of the aforementioned techniques in order to evaluate one or more pre-generated graphics resources 216 as candidates for compression. In some embodiments, for example, one or more pre-generated graphics resources 216 may comprise resources that were not good candidates for compression using the compression formats available at a time of creation of graphics application 209, but that may be good candidates for compression using new compression formats that have become available since that time. In various embodiments, the compression decision logic may be operative to evaluate one or more such pre-generated graphics resources 216 as candidates for compression using a feedback loop, according to which quality metrics for one or more compressed versions of a given pre-generated graphics resource 216 may be determined and compared with quality criteria for that pre-generated graphics resource 216. In some embodiments, the compression decision logic may be operative to determine whether to compress the pre-generated graphics resource 216 based on the comparisons of the quality metrics and the quality criteria. For example, in various embodiments, the compression decision logic may be operative to determine to compress the pre-generated graphics resource 216 if the quality metric(s) associated with at least one compressed version of the pre-generated graphics resource 216 satisfy the quality criteria for the pre-generated graphics resource 216. The embodiments are not limited in this context.

Operations for the above embodiments may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited in this context.

Figure 3:
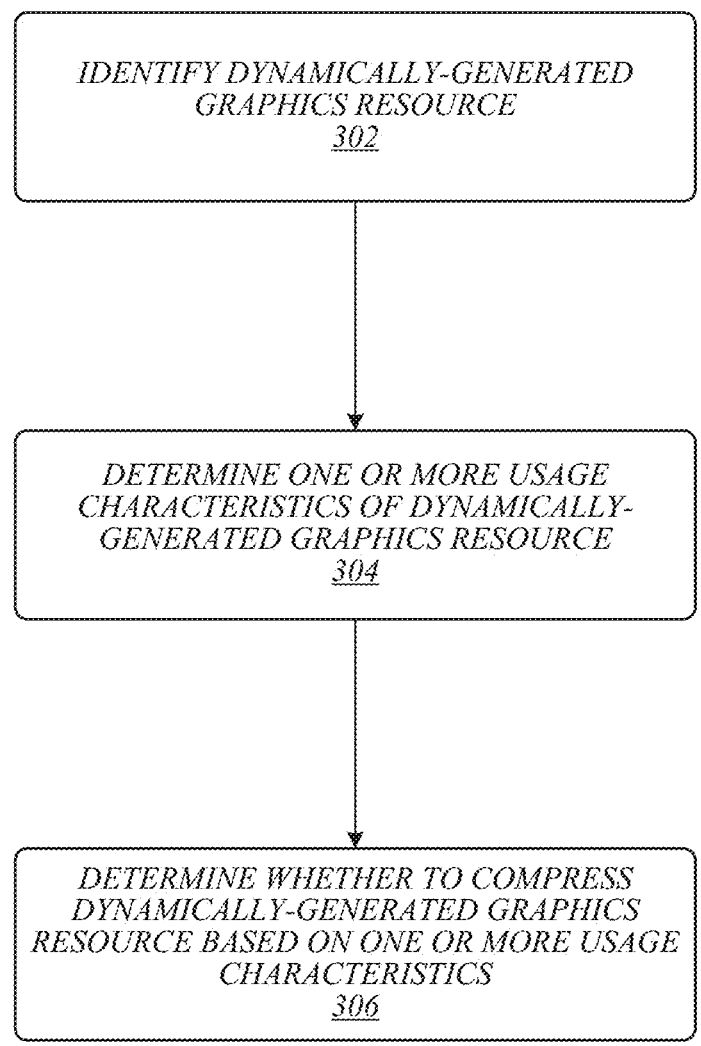
FIG. 3 illustrates an embodiment of a first logic flow.

FIG. 3 illustrates an embodiment of a logic flow 300, which may be representative of the operations executed by one or more embodiments described herein. For example, logic flow 300 may be representative of operations that may be performed in various embodiments by one or more components of apparatus 200 and/or system 240 of FIG. 2. As shown in logic flow 300, a dynamically-generated graphics resource may be identified at 302. For example, one or more components of the compression decision logic of FIG. 2 may be operative to identify a dynamically-generated graphics resource 218. It is worthy of note that in some embodiments, identification of the dynamically-generated graphics resource may occur before the generation of the dynamically-generated graphics resource has been started and/or completed. At 304, one or more usage characteristics of the dynamically-generated graphics resource may be determined. For example, one or more components of the compression decision logic of FIG. 2 may be operative to determine one or more resource usage characteristics 228 of an identified dynamically-generated graphics resource 218. At 306, it may be determined whether to compress the dynamically-generated graphics resource, based on the one or more usage characteristics. For example, one or more components of the compression decision logic of FIG. 2 may be operative to determine whether to compress an identified dynamically-generated graphics resource 218 based on one or more determined resource usage characteristics 228 of the identified dynamically-generated graphics resource 218. The embodiments are not limited to these examples.

Figure 4:
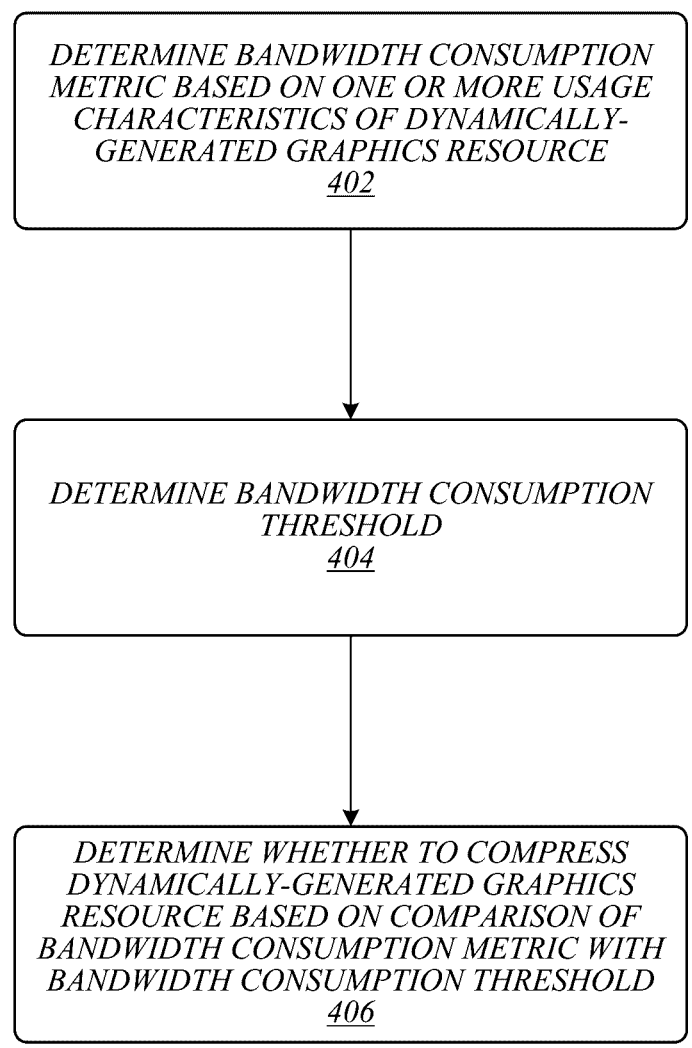
FIG. 4 illustrates an embodiment of a second logic flow.

FIG. 4 illustrates an embodiment of a logic flow 400, which may be representative of the operations executed by one or more embodiments described herein. For example, logic flow 400 may be representative of operations that may be performed in various embodiments by one or more components of apparatus 200 and/or system 240 of FIG. 2 in conjunction with the determination performed at block 306 in logic flow 300 of FIG. 3. As shown in logic flow 400, a bandwidth consumption metric may be determined at 402 based on one or more usage characteristics of a dynamically-generated graphics resource. For example, one or more components of the compression decision logic of FIG. 2 may be operative to determine a bandwidth consumption metric 232 for a dynamically-generated graphics resource 218 based on one or more resource usage characteristics 228 of that dynamically-generated graphics resource 218. At 404, a bandwidth consumption threshold may be determined. For example, one or more components of the compression decision logic of FIG. 2 may be operative to determine a bandwidth consumption threshold 234 for a dynamically-generated graphics resource 218 for which a bandwidth consumption metric 232 has been determined. At 406, it may be determined whether to compress the dynamically-generated graphics resource, based on a comparison of the bandwidth consumption metric with the bandwidth consumption threshold. For example, one or more components of the compression decision logic of FIG. 2 may be operative to determine whether to compress a dynamically-generated graphics resource 218 by comparing a bandwidth consumption metric 232 for that dynamically-generated graphics resource 218 with a bandwidth consumption threshold 234. In various embodiments, it may be determined that the dynamically-generated graphics resource is to be compressed if the bandwidth consumption metric exceeds the bandwidth consumption threshold, and it may be determined that the dynamically-generated graphics resource is not to be compressed if the bandwidth consumption metric is less than the bandwidth consumption threshold. The embodiments are not limited in this context.

Figure 5:
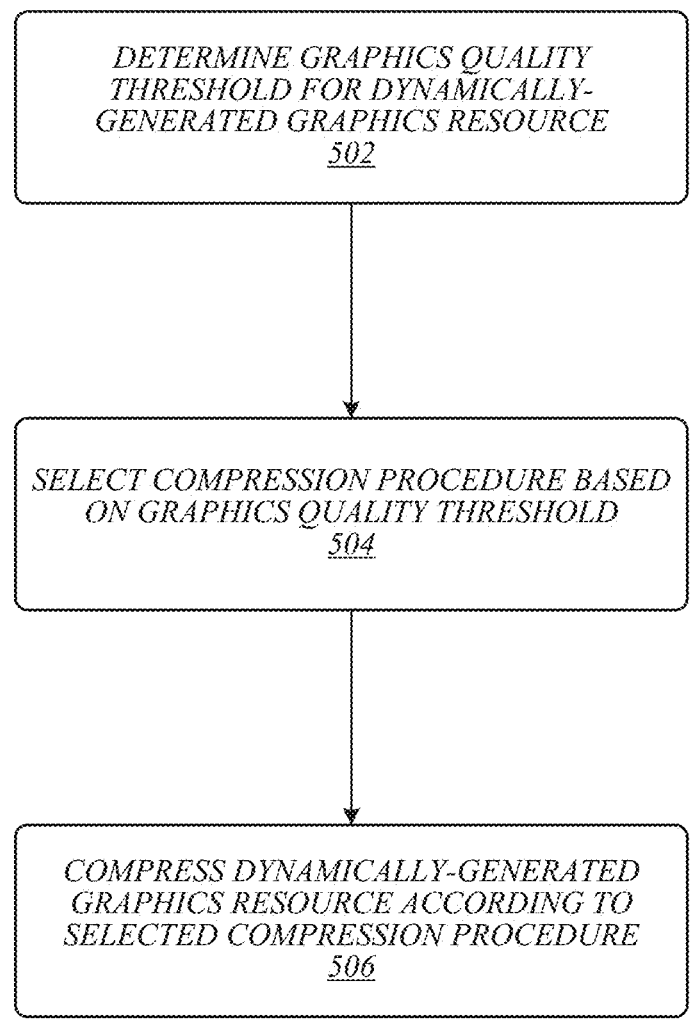
FIG. 5 illustrates an embodiment of a third logic flow.

FIG. 5 illustrates an embodiment of a logic flow 500, which may be representative of the operations executed by one or more embodiments described herein. For example, logic flow 500 may be representative of operations that may be performed in various embodiments by one or more components of apparatus 200 and/or system 240 of FIG. 2 in response to a determination at 306 in logic flow 300 of FIG. 3 that the dynamically-generated graphics resource is to be compressed. As shown in logic flow 500, a graphics quality threshold for a dynamically-generated graphics resource may be determined at 502. For example, one or more components of the compression decision logic of FIG. 2 may be operative to determine a graphics quality threshold 238 for a dynamically-generated graphics resource 218. At 504, a compression procedure may be selected based on the graphics quality threshold. For example, one or more components of the compression decision logic of FIG. 2 may be operative to select a compression procedure for a dynamically-generated graphics resource 218 based on a graphics quality threshold 238 for the dynamically-generated graphics resource 218. At 506, the dynamically-generated graphics resource may be compressed according to the selected compression procedure. For example, compression component 222 of FIG. 2 may be operative to compress a dynamically-generated graphics resource 218 according to a compression procedure selected based on a graphics quality threshold 238 for that dynamically-generated graphics resource 218. The embodiments are not limited to these examples.

Figure 6:
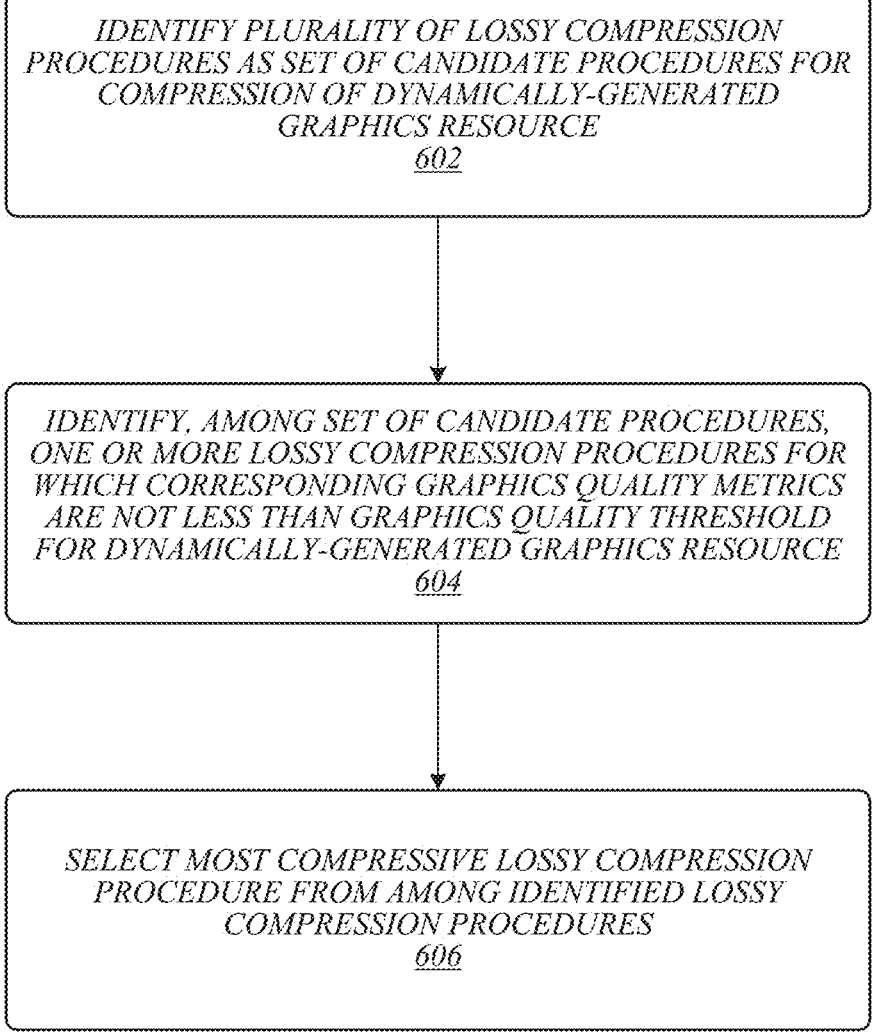
FIG. 6 illustrates an embodiment of a fourth logic flow.

FIG. 6 illustrates an embodiment of a logic flow 600, which may be representative of the operations executed by one or more embodiments described herein. For example, logic flow 600 may be representative of operations that may be performed in various embodiments by one or more components of apparatus 200 and/or system 240 of FIG. 2 in conjunction with the selection performed at block 504 in logic flow 500 of FIG. 5. As shown in logic flow 600, a plurality of lossy compression procedures may be identified as a set of candidate procedures for compression of a dynamically-generated graphics resource at 602. For example, one or more components of the compression decision logic of FIG. 2 may be operative to identify a plurality of lossy compression procedures as a set of candidate procedures for compression of a dynamically-generated graphics resource 218. At 604, among the set of candidate procedures, one or more lossy compression procedures may be identified for which the corresponding graphics quality metrics are not less than the graphics quality threshold for the dynamically-generated graphics resource. For example, one or more components of the compression decision logic of FIG. 2 may be operative to identify, from among a set of candidate procedures for compression of a dynamically-generated graphics resource 218, one or more lossy compression procedures for which the respective corresponding graphics quality metrics 236 are not less than the graphics quality threshold 238 for the dynamically-generated graphics resource 218. At 606, the most compressive lossy compression procedure may be selected from among the identified lossy compression procedure. For example, one or more components of the compression decision logic of FIG. 2 may be operative to select a most compressive lossy compression procedure from among one or more lossy compression procedures identified at 604. The embodiments are not limited to these examples.

FIG. 7 illustrates an embodiment of a storage medium 700. Storage medium 700 may comprise any non-transitory computer-readable storage medium or machine-readable storage medium, such as an optical, magnetic or semiconductor storage medium. In various embodiments, storage medium 700 may comprise an article of manufacture. In some embodiments, storage medium 700 may store computer-executable instructions, such as computer-executable instructions to implement one or more of logic flow 300 of FIG. 3, logic flow 400 of FIG. 4, logic flow 500 of FIG. 5, and logic flow 600 of FIG. 6. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like. The embodiments are not limited in this context.

Figure 8:
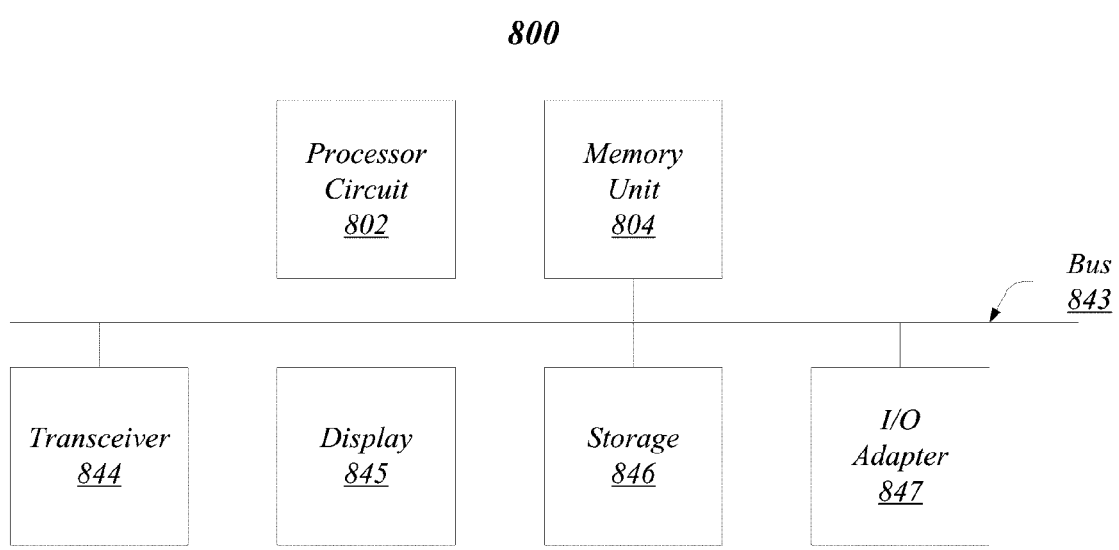
FIG. 8 illustrates an embodiment of a second system.

FIG. 8 illustrates one embodiment of a system 800. In various embodiments, system 800 may be representative of a system or architecture suitable for use with one or more embodiments described herein, such as apparatus 200 and/or system 240 of FIG. 2, logic flow 300 of FIG. 3, logic flow 400 of FIG. 4, logic flow 500 of FIG. 5, logic flow 600 of FIG. 6, and/or storage medium 700 of FIG. 7. The embodiments are not limited in this respect.

As shown in FIG. 8, system 800 may include multiple elements. One or more elements may be implemented using one or more circuits, components, registers, processors, software subroutines, modules, or any combination thereof, as desired for a given set of design or performance constraints. Although FIG. 8 shows a limited number of elements in a certain topology by way of example, it can be appreciated that more or less elements in any suitable topology may be used in system 800 as desired for a given implementation. The embodiments are not limited in this context.

In various embodiments, system 800 may include a processor circuit 802. Processor circuit 802 may be implemented using any processor or logic device, and may be the same as or similar to processor circuit 202 of FIG. 2.

In one embodiment, system 800 may include a memory unit 804 to couple to processor circuit 802. Memory unit 804 may be coupled to processor circuit 802 via communications bus 843, or by a dedicated communications bus between processor circuit 802 and memory unit 804, as desired for a given implementation. Memory unit 804 may be implemented using any machine-readable or computer-readable media capable of storing data, including both volatile and non-volatile memory, and may be the same as or similar to memory unit 204 of FIG. 2. In some embodiments, the machine-readable or computer-readable medium may include a non-transitory medium. The embodiments are not limited in this context.

In various embodiments, system 800 may include an RF transceiver 844. RF transceiver 844 may include one or more radios capable of transmitting and receiving signals using various suitable wireless communications techniques, and may be the same as or similar to RF transceiver 242 of FIG. 2.

In various embodiments, system 800 may include a display 845. Display 845 may comprise any display device capable of displaying information received from processor circuit 802, and may be the same as or similar to display 246 of FIG. 2. The embodiments are not limited in this context.

In various embodiments, system 800 may include storage 846. Storage 846 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 846 may include technology to increase the storage performance enhanced protection for valuable digital media when multiple hard drives are included, for example. Further examples of storage 846 may include a hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of DVD devices, a tape device, a cassette device, or the like. The embodiments are not limited in this context.

In various embodiments, system 800 may include one or more I/O adapters 847. Examples of I/O adapters 847 may include Universal Serial Bus (USB) ports/adapters, IEEE 1394 Firewire ports/adapters, and so forth. The embodiments are not limited in this context.

FIG. 9 illustrates an embodiment of a system 900. In various embodiments, system 900 may be representative of a system or architecture suitable for use with one or more embodiments described herein, such as apparatus 200 and/or system 240 of FIG. 2, logic flow 300 of FIG. 3, logic flow 400 of FIG. 4, logic flow 500 of FIG. 5, logic flow 600 of FIG. 6, storage medium 700 of FIG. 7, and/or system 800 of FIG. 8. The embodiments are not limited in this respect.

As shown in FIG. 9, system 900 may include multiple elements. One or more elements may be implemented using one or more circuits, components, registers, processors, software subroutines, modules, or any combination thereof, as desired for a given set of design or performance constraints. Although FIG. 9 shows a limited number of elements in a certain topology by way of example, it can be appreciated that more or less elements in any suitable topology may be used in system 900 as desired for a given implementation. The embodiments are not limited in this context.

In embodiments, system 900 may be a media system although system 900 is not limited to this context. For example, system 900 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, system 900 includes a platform 901 coupled to a display 945. Platform 901 may receive content from a content device such as content services device(s) 948 or content delivery device(s) 949 or other similar content sources. A navigation controller 950 including one or more navigation features may be used to interact with, for example, platform 901 and/or display 945. Each of these components is described in more detail below.

In embodiments, platform 901 may include any combination of a processor circuit 902, chipset 903, memory unit 904, transceiver 944, storage 946, applications 951, and/or graphics subsystem 952. Chipset 903 may provide intercommunication among processor circuit 902, memory unit 904, transceiver 944, storage 946, applications 951, and/or graphics subsystem 952. For example, chipset 903 may include a storage adapter (not depicted) capable of providing intercommunication with storage 946.

Processor circuit 902 may be implemented using any processor or logic device, and may be the same as or similar to processor circuit 802 in FIG. 8.

Memory unit 904 may be implemented using any machine-readable or computer-readable media capable of storing data, and may be the same as or similar to memory unit 804 in FIG. 8.

Transceiver 944 may include one or more radios capable of transmitting and receiving signals using various suitable wireless communications techniques, and may be the same as or similar to transceiver 844 in FIG. 8.

Display 945 may include any television type monitor or display, and may be the same as or similar to display 845 in FIG. 8.

Storage 946 may be implemented as a non-volatile storage device, and may be the same as or similar to storage 846 in FIG. 8.

Graphics subsystem 952 may perform processing of images such as still or video for display. Graphics subsystem 952 may be a graphics processing unit (GPU) or a visual processing unit (VPU), for example. An analog or digital interface may be used to communicatively couple graphics subsystem 952 and display 945. For example, the interface may be any of a High-Definition Multimedia Interface, DisplayPort, wireless HDMI, and/or wireless HD compliant techniques. Graphics subsystem 952 could be integrated into processor circuit 902 or chipset 903. Graphics subsystem 952 could be a stand-alone card communicatively coupled to chipset 903.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

In embodiments, content services device(s) 948 may be hosted by any national, international and/or independent service and thus accessible to platform 901 via the Internet, for example. Content services device(s) 948 may be coupled to platform 901 and/or to display 945. Platform 901 and/or content services device(s) 948 may be coupled to a network 953 to communicate (e.g., send and/or receive) media information to and from network 953. Content delivery device(s) 949 also may be coupled to platform 901 and/or to display 945.

In embodiments, content services device(s) 948 may include a cable television box, personal computer, network, telephone, Internet enabled devices or appliance capable of delivering digital information and/or content, and any other similar device capable of unidirectionally or bidirectionally communicating content between content providers and platform 901 and/display 945, via network 953 or directly. It will be appreciated that the content may be communicated unidirectionally and/or bidirectionally to and from any one of the components in system 900 and a content provider via network 953. Examples of content may include any media information including, for example, video, music, medical and gaming information, and so forth.

Content services device(s) 948 receives content such as cable television programming including media information, digital information, and/or other content. Examples of content providers may include any cable or satellite television or radio or Internet content providers. The provided examples are not meant to limit embodiments of the disclosed subject matter.

In embodiments, platform 901 may receive control signals from navigation controller 950 having one or more navigation features. The navigation features of navigation controller 950 may be used to interact with a user interface 954, for example. In embodiments, navigation controller 950 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of navigation controller 950 may be echoed on a display (e.g., display 945) by movements of a pointer, cursor, focus ring, or other visual indicators displayed on the display. For example, under the control of software applications 951, the navigation features located on navigation controller 950 may be mapped to virtual navigation features displayed on user interface 954. In embodiments, navigation controller 950 may not be a separate component but integrated into platform 901 and/or display 945. Embodiments, however, are not limited to the elements or in the context shown or described herein.

In embodiments, drivers (not shown) may include technology to enable users to instantly turn on and off platform 901 like a television with the touch of a button after initial boot-up, when enabled, for example. Program logic may allow platform 901 to stream content to media adaptors or other content services device(s) 948 or content delivery device(s) 949 when the platform is turned "off." In addition, chip set 903 may include hardware and/or software support for 5.1 surround sound audio and/or high definition 7.1 surround sound audio, for example. Drivers may include a graphics driver for integrated graphics platforms. In embodiments, the graphics driver may include a peripheral component interconnect (PCI) Express graphics card.

In various embodiments, any one or more of the components shown in system 900 may be integrated. For example, platform 901 and content services device(s) 948 may be integrated, or platform 901 and content delivery device(s) 949 may be integrated, or platform 901, content services device(s) 948, and content delivery device(s) 949 may be integrated, for example. In various embodiments, platform 901 and display 945 may be an integrated unit. Display 945 and content service device(s) 948 may be integrated, or display 945 and content delivery device(s) 949 may be integrated, for example. These examples are not meant to limit the disclosed subject matter.

In various embodiments, system 900 may be implemented as a wireless system, a wired system, or a combination of both. When implemented as a wireless system, system 900 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 900 may include components and interfaces suitable for communicating over wired communications media, such as I/O adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 901 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 9.

Figure 10:
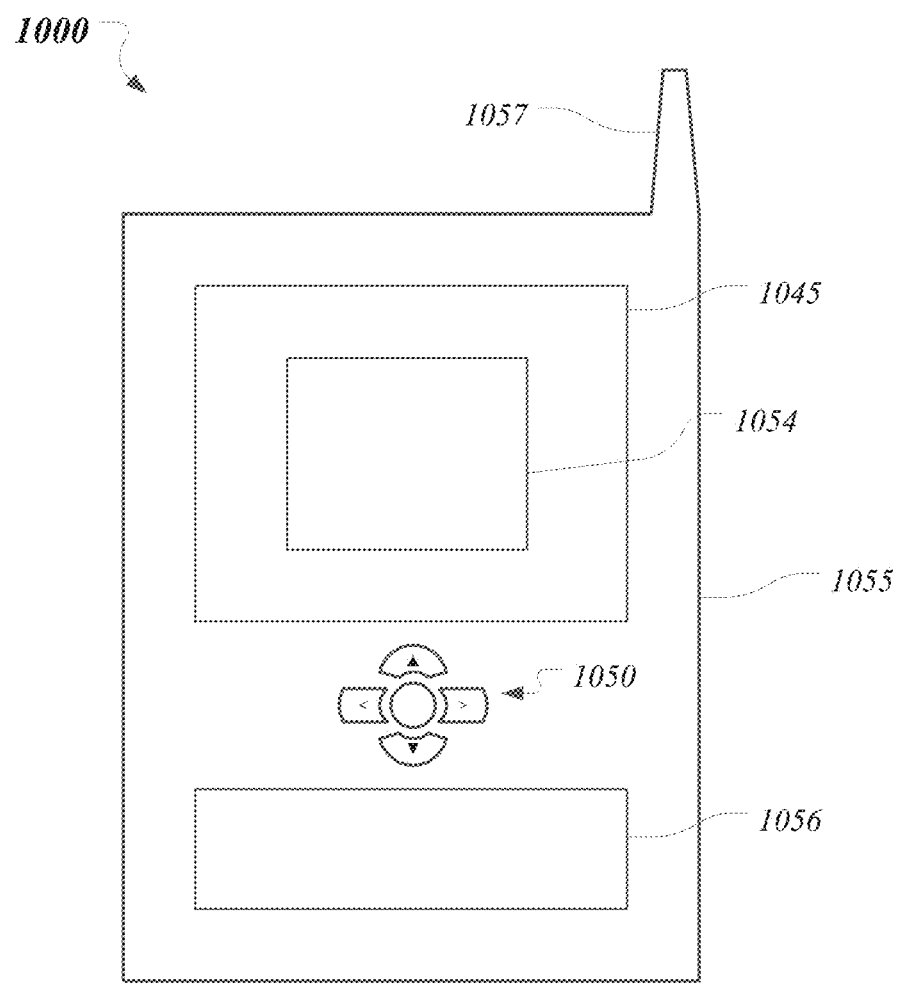
FIG. 10 illustrates an embodiment of a device.

As described above, system 900 may be embodied in varying physical styles or form factors. FIG. 10 illustrates embodiments of a small form factor device 1000 in which system 900 may be embodied. In embodiments, for example, device 1000 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 10, device 1000 may include a display 1045, a navigation controller 1050, a user interface 1054, a housing 1055, an I/O device 1056, and an antenna 1057. Display 1045 may include any suitable display unit for displaying information appropriate for a mobile computing device, and may be the same as or similar to display 945 in FIG. 9. Navigation controller 1050 may include one or more navigation features which may be used to interact with user interface 1054, and may be the same as or similar to navigation controller 950 in FIG. 9. I/O device 1056 may include any suitable I/O device for entering information into a mobile computing device. Examples for I/O device 1056 may include an alphanumeric keyboard, a numeric keypad, a touch pad, input keys, buttons, switches, rocker switches, microphones, speakers, voice recognition device and software, and so forth. Information also may be entered into device 1000 by way of microphone. Such information may be digitized by a voice recognition device. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The following examples pertain to further embodiments:

Example 1 is a graphics processing apparatus, comprising logic, at least a portion of which is in hardware, the logic to determine one or more usage characteristics of a dynamically-generated graphics resource, determine whether to compress the dynamically-generated graphics resource based on the one or more usage characteristics, and in response to a determination to compress the dynamically-generated graphics resource, select a compression procedure based on a graphics quality threshold for the dynamically-generated graphics resource.

In Example 2, the logic of Example 1 may optionally determine a memory bandwidth consumption metric based on the one or more usage characteristics and determine whether to compress the dynamically-generated graphics resource based on the memory bandwidth consumption metric.

In Example 3, the graphics quality threshold of any of Examples 1 to 2 may optionally indicate an acceptable degree of quality reduction for the dynamically-generated graphics resource.

In Example 4, the logic of any of Examples 1 to 3 may optionally determine whether to compress the dynamically-generated graphics resource based on the one or more usage characteristics and the graphics quality threshold for the dynamically-generated graphics resource.

In Example 5, the logic of any of Examples 1 to 4 may optionally select a lossy compression procedure.

In Example 6, the logic of Example 5 may optionally select the lossy compression procedure from among a plurality of lossy compression procedures.

In Example 7, the logic of Example 6 may optionally select, from among the plurality of lossy compression procedures, a most compressive lossy compression procedure for which a corresponding graphics quality metric is not less than the graphics quality threshold.

In Example 8, the lossy compression procedure of any of Examples 5 to 7 may optionally comprise an adaptive scalable texture compression (ASTC) compression algorithm.

In Example 9, the lossy compression procedure of any of Examples 5 to 7 may optionally comprise a block compression (BC) compression algorithm.

In Example 10, the BC compression algorithm of Example 9 may optionally comprise BC6 or BC7.

In Example 11, the logic of any of Examples 1 to 4 may optionally select a lossless compression procedure.

In Example 12, the logic of any of Examples 1 to 11 may optionally compress the dynamically-generated graphics resource according to the selected compression procedure and store the compressed dynamically-generated graphics resource in a memory unit.

In Example 13, the logic of Example 12 may optionally compress the dynamically-generated graphics resource using a shader that compresses to a compressed texture format.

In Example 14, the logic of any of Examples 12 to 13 may optionally retrieve the compressed dynamically-generated graphics resource from the memory unit and generate a graphics frame based on the compressed dynamically-generated graphics resource.

In Example 15, the logic of Example 14 may optionally decompress the compressed dynamically-generated graphics resource and generate the graphics frame based on the decompressed dynamically-generated graphics resource.

In Example 16, the logic of Example 14 may optionally generate an intermediate render target based on the compressed dynamically-generated graphics resource and generate the graphics frame based on the intermediate render target.

In Example 17, the logic of any of Examples 12 to 16 may optionally compress a second dynamically-generated graphics resource according to a second compression procedure that differs from the selected compression procedure.

In Example 18, the logic of any of Examples 1 to 17 may optionally evaluate a pre-generated graphics resource as a candidate for compression.

In Example 19, the logic of Example 18 may optionally determine quality metrics for one or more compressed versions of the pre-generated graphics resource.

In Example 20, the logic of Example 19 may optionally determine whether to compress the pre-generated graphics resource by comparing the quality metrics for the one or more compressed versions of the pre-generated graphics resource to quality criteria for the pre-generated graphics resource.

In Example 21, the dynamically-generated graphics resource of any of Examples 1 to 20 may optionally comprise a texture.

In Example 22, the dynamically-generated graphics resource of any of Examples 1 to 21 may optionally be generated in a stage of a rendering pipeline for 3D graphics content.

Example 23 is a system, comprising a graphics processing apparatus according to any of Examples 1 to 22, a radio frequency (RF) transceiver, and one or more RF antennas.

Example 24 is the system of Example 23, comprising a display.

Example 25 is at least one non-transitory computer-readable storage medium comprising a set of graphics processing instructions that, in response to being executed on a computing device, cause the computing device to determine one or more usage characteristics of a dynamically-generated graphics resource, determine whether to compress the dynamically-generated graphics resource based on the one or more usage characteristics, and in response to a determination to compress the dynamically-generated graphics resource, select a compression procedure based on a graphics quality threshold for the dynamically-generated graphics resource.

In Example 26, the at least one non-transitory computer-readable storage medium of Example 25 may optionally comprise graphics processing instructions that, in response to being executed on the computing device, cause the computing device to determine a memory bandwidth consumption metric based on the one or more usage characteristics, and determine whether to compress the dynamically-generated graphics resource based on the memory bandwidth consumption metric.

In Example 27, the graphics quality threshold of any of Examples 25 to 26 may optionally indicate an acceptable degree of quality reduction for the dynamically-generated graphics resource.

In Example 28, the at least one non-transitory computer-readable storage medium of any of Examples 25 to 27 may optionally comprise graphics processing instructions that, in response to being executed on the computing device, cause the computing device to determine whether to compress the dynamically-generated graphics resource based on the one or more usage characteristics and the graphics quality threshold for the dynamically-generated graphics resource.

In Example 29, the at least one non-transitory computer-readable storage medium of any of Examples 25 to 28 may optionally comprise graphics processing instructions that, in response to being executed on the computing device, cause the computing device to select a lossy compression procedure.

In Example 30, the at least one non-transitory computer-readable storage medium of Example 29 may optionally comprise graphics processing instructions that, in response to being executed on the computing device, cause the computing device to select the lossy compression procedure from among a plurality of lossy compression procedures.

In Example 31, the at least one non-transitory computer-readable storage medium of Example 30 may optionally comprise graphics processing instructions that, in response to being executed on the computing device, cause the computing device to select, from among the plurality of lossy compression procedures, a most compressive lossy compression procedure for which a corresponding graphics quality metric is not less than the graphics quality threshold.

In Example 32, the lossy compression procedure of any of Examples 29 to 31 may optionally comprise an adaptive scalable texture compression (ASTC) compression algorithm.

In Example 33, the lossy compression procedure of any of Examples 29 to 31 may optionally comprise a block compression (BC) compression algorithm.

In Example 34, the BC compression algorithm of Example 33 may optionally comprise BC6 or BC7.

In Example 35, the at least one non-transitory computer-readable storage medium of any of Examples 25 to 28 may optionally comprise graphics processing instructions that, in response to being executed on the computing device, cause the computing device to select a lossless compression procedure.

In Example 36, the at least one non-transitory computer-readable storage medium of any of Examples 25 to 35 may optionally comprise graphics processing instructions that, in response to being executed on the computing device, cause the computing device to compress the dynamically-generated graphics resource according to the selected compression procedure, and store the compressed dynamically-generated graphics resource in a memory unit.

In Example 37, the at least one non-transitory computer-readable storage medium of Example 36 may optionally comprise graphics processing instructions that, in response to being executed on the computing device, cause the computing device to compress the dynamically-generated graphics resource using a shader that compresses to a compressed texture format.

In Example 38, the at least one non-transitory computer-readable storage medium of any of Examples 36 to 37 may optionally comprise graphics processing instructions that, in response to being executed on the computing device, cause the computing device to retrieve the compressed dynamically-generated graphics resource from the memory unit, and generate a graphics frame based on the compressed dynamically-generated graphics resource.

In Example 39, the at least one non-transitory computer-readable storage medium of Example 38 may optionally comprise graphics processing instructions that, in response to being executed on the computing device, cause the computing device to decompress the compressed dynamically-generated graphics resource, and generate the graphics frame based on the decompressed dynamically-generated graphics resource.

In Example 40, the at least one non-transitory computer-readable storage medium of Example 38 may optionally comprise graphics processing instructions that, in response to being executed on the computing device, cause the computing device to generate an intermediate render target based on the compressed dynamically-generated graphics resource, and generate the graphics frame based on the intermediate render target.

In Example 41, the at least one non-transitory computer-readable storage medium of any of Examples 36 to 40 may optionally comprise graphics processing instructions that, in response to being executed on the computing device, cause the computing device to compress a second dynamically-generated graphics resource according to a second compression procedure that differs from the selected compression procedure.

In Example 42, the at least one non-transitory computer-readable storage medium of any of Examples 25 to 41, may optionally comprise graphics processing instructions that, in response to being executed on the computing device, cause the computing device to evaluate a pre-generated graphics resource as a candidate for compression.

In Example 43, the at least one non-transitory computer-readable storage medium of Example 42 may optionally comprise graphics processing instructions that, in response to being executed on the computing device, cause the computing device to determine quality metrics for one or more compressed versions of the pre-generated graphics resource.

In Example 44, the at least one non-transitory computer-readable storage medium of Example 43 may optionally comprise graphics processing instructions that, in response to being executed on the computing device, cause the computing device to determine whether to compress the pre-generated graphics resource by comparing the quality metrics for the one or more compressed versions of the pre-generated graphics resource to quality criteria for the pre-generated graphics resource.

In Example 45, the dynamically-generated graphics resource of any of Examples 25 to 44 may optionally comprise a texture.

In Example 46, the dynamically-generated graphics resource of any of Examples 25 to 45 may optionally be generated in a stage of a rendering pipeline for 3D graphics content.

Example 47 is a graphics processing method, comprising determining, by a processor circuit, one or more usage characteristics of a dynamically-generated graphics resource, determining whether to compress the dynamically-generated graphics resource based on the one or more usage characteristics, and in response to a determination to compress the dynamically-generated graphics resource, selecting a compression procedure based on a graphics quality threshold for the dynamically-generated graphics resource.

In Example 48, the graphics processing method of Example 47 may optionally comprise determining a memory bandwidth consumption metric based on the one or more usage characteristics, and determining whether to compress the dynamically-generated graphics resource based on the memory bandwidth consumption metric.

In Example 49, the graphics quality threshold of any of Examples 47 to 48 may optionally indicate an acceptable degree of quality reduction for the dynamically-generated graphics resource.

In Example 50, the graphics processing method of any of Examples 47 to 49 may optionally comprise determining whether to compress the dynamically-generated graphics resource based on the one or more usage characteristics and the graphics quality threshold for the dynamically-generated graphics resource.

In Example 51, the graphics processing method of any of Examples 47 to 50 may optionally comprise selecting a lossy compression procedure.

In Example 52, the graphics processing method of Example 51 may optionally comprise selecting the lossy compression procedure from among a plurality of lossy compression procedures.

In Example 53, the graphics processing method of Example 52 may optionally comprise selecting, from among the plurality of lossy compression procedures, a most compressive lossy compression procedure for which a corresponding graphics quality metric is not less than the graphics quality threshold.

In Example 54, the lossy compression procedure of any of Examples 51 to 53 may optionally comprise an adaptive scalable texture compression (ASTC) compression algorithm.

In Example 55, the lossy compression procedure of any of Examples 51 to 53 may optionally comprise a block compression (BC) compression algorithm.

In Example 56, the BC compression algorithm of Example 55 may optionally comprise BC6 or BC7.

In Example 57, the graphics processing method of any of Examples 47 to 50 may optionally comprise selecting a lossless compression procedure.

In Example 58, the graphics processing method of any of Examples 47 to 57 may optionally comprise compressing the dynamically-generated graphics resource according to the selected compression procedure, and storing the compressed dynamically-generated graphics resource in a memory unit.

In Example 59, the graphics processing method of Example 58 may optionally comprise compressing the dynamically-generated graphics resource using a shader that compresses to a compressed texture format.

In Example 60, the graphics processing method of any of Examples 58 to 59 may optionally comprise retrieving the compressed dynamically-generated graphics resource from the memory unit, and generating a graphics frame based on the compressed dynamically-generated graphics resource.

In Example 61, the graphics processing method of Example 60 may optionally comprise decompressing the compressed dynamically-generated graphics resource, and generating the graphics frame based on the decompressed dynamically-generated graphics resource.

In Example 62, the graphics processing method of Example 60 may optionally comprise generating an intermediate render target based on the compressed dynamically-generated graphics resource, and generating the graphics frame based on the intermediate render target.

In Example 63, the graphics processing method of any of Examples 58 to 62 may optionally comprise compressing a second dynamically-generated graphics resource according to a second compression procedure that differs from the selected compression procedure.

In Example 64, the graphics processing method of any of Examples 47 to 63 may optionally comprise evaluating a pre-generated graphics resource as a candidate for compression.

In Example 65, the graphics processing method of Example 64 may optionally comprise determining quality metrics for one or more compressed versions of the pre-generated graphics resource.

In Example 66, the graphics processing method of Example 65 may optionally comprise determining whether to compress the pre-generated graphics resource by comparing the quality metrics for the one or more compressed versions of the pre-generated graphics resource to quality criteria for the pre-generated graphics resource.

In Example 67, the dynamically-generated graphics resource of any of Examples 47 to 66 may optionally comprise a texture.

In Example 68, the dynamically-generated graphics resource of any of Examples 47 to 67 may optionally be generated in a stage of a rendering pipeline for 3D graphics content.

Example 69 is at least one non-transitory computer-readable storage medium comprising a set of instructions that, in response to being executed on a computing device, cause the computing device to perform a graphics processing method according to any of Examples 47 to 68.

Example 70 is an apparatus, comprising means for performing a graphics processing method according to any of Examples 47 to 68.

Example 71 is a system, comprising a graphics processing apparatus according to Example 70, a radio frequency (RF) transceiver, and one or more RF antennas.

Example 72 is the system of Example 71, comprising a display.

Example 73 is a graphics processing apparatus, comprising means for determining one or more usage characteristics of a dynamically-generated graphics resource, means for determining whether to compress the dynamically-generated graphics resource based on the one or more usage characteristics, and means for, in response to a determination to compress the dynamically-generated graphics resource, selecting a compression procedure based on a graphics quality threshold for the dynamically-generated graphics resource.

In Example 74, the graphics processing apparatus of Example 73 may optionally comprise means for determining a memory bandwidth consumption metric based on the one or more usage characteristics, and means for determining whether to compress the dynamically-generated graphics resource based on the memory bandwidth consumption metric.

In Example 75, the graphics quality threshold of any of Examples 73 to 74 may optionally indicate an acceptable degree of quality reduction for the dynamically-generated graphics resource.

In Example 76, the graphics processing apparatus of any of Examples 73 to 75 may optionally comprise means for determining whether to compress the dynamically-generated graphics resource based on the one or more usage characteristics and the graphics quality threshold for the dynamically-generated graphics resource.

In Example 77, the graphics processing apparatus of any of Examples 73 to 76 may optionally comprise means for selecting a lossy compression procedure.

In Example 78, the graphics processing apparatus of Example 77 may optionally comprise means for selecting the lossy compression procedure from among a plurality of lossy compression procedures.

In Example 79, the graphics processing apparatus of Example 78 may optionally comprise means for selecting, from among the plurality of lossy compression procedures, a most compressive lossy compression procedure for which a corresponding graphics quality metric is not less than the graphics quality threshold.

In Example 80, the lossy compression procedure of any of Examples 77 to 79 may optionally comprise an adaptive scalable texture compression (ASTC) compression algorithm.

In Example 81, the lossy compression procedure of any of Examples 77 to 79 may optionally comprise a block compression (BC) compression algorithm.

In Example 82, the BC compression algorithm of Example 81 may optionally comprise BC6 or BC7.

In Example 83, the graphics processing apparatus of any of Examples 73 to 76 may optionally comprise means for selecting a lossless compression procedure.

In Example 84, the graphics processing apparatus of any of Examples 73 to 83 may optionally comprise means for compressing the dynamically-generated graphics resource according to the selected compression procedure, and means for storing the compressed dynamically-generated graphics resource in a memory unit.

In Example 85, the graphics processing apparatus of Example 84 may optionally comprise means for compressing the dynamically-generated graphics resource using a shader that compresses to a compressed texture format.

In Example 86, the graphics processing apparatus of any of Examples 84 to 85 may optionally comprise means for retrieving the compressed dynamically-generated graphics resource from the memory unit, and means for generating a graphics frame based on the compressed dynamically-generated graphics resource.

In Example 87, the graphics processing apparatus of Example 86 may optionally comprise means for decompressing the compressed dynamically-generated graphics resource, and means for generating the graphics frame based on the decompressed dynamically-generated graphics resource.

In Example 88, the graphics processing apparatus of Example 86 may optionally comprise means for generating an intermediate render target based on the compressed dynamically-generated graphics resource, and means for generating the graphics frame based on the intermediate render target.

In Example 89, the graphics processing apparatus of any of Examples 84 to 88 may optionally comprise means for compressing a second dynamically-generated graphics resource according to a second compression procedure that differs from the selected compression procedure.

In Example 90, the graphics processing apparatus of any of Examples 73 to 89 may optionally comprise means for evaluating a pre-generated graphics resource as a candidate for compression.

In Example 91, the graphics processing apparatus of Example 90 may optionally comprise means for determining quality metrics for one or more compressed versions of the pre-generated graphics resource.

In Example 92, the graphics processing apparatus of Example 91 may optionally comprise means for determining whether to compress the pre-generated graphics resource by comparing the quality metrics for the one or more compressed versions of the pre-generated graphics resource to quality criteria for the pre-generated graphics resource.

In Example 93, the dynamically-generated graphics resource of any of Examples 73 to 92 may optionally comprise a texture.

In Example 94, the dynamically-generated graphics resource of any of Examples 73 to 93 may optionally be generated in a stage of a rendering pipeline for 3D graphics content.

Example 95 is a system, comprising a graphics processing apparatus according to any of Examples 73 to 94, a radio frequency (RF) transceiver, and one or more RF antennas.

Example 96 is the system of Example 95, comprising a display.

Numerous specific details have been set forth herein to provide a thorough understanding of the embodiments. It will be understood by those skilled in the art, however, that the embodiments may be practiced without these specific details. In other instances, well-known operations, components, and circuits have not been described in detail so as not to obscure the embodiments. It can be appreciated that the specific structural and functional details disclosed herein may be representative and do not necessarily limit the scope of the embodiments.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus, comprising:
   logic, at least a portion of which is in hardware, the logic to
   determine, during a pass of a generation process for a graphics frame, one or more usage characteristics that indicate how frequently a dynamically-generated graphics resource will traverse a memory bus during a remainder of the generation process for the graphics frame,
   determine whether to compress the dynamically-generated graphics resource based on the one or more usage characteristics, and
   in response to a determination to compress the dynamically-generated graphics resource:
      select a compression procedure based on a graphics quality threshold for the dynamically-generated graphics resource;
      compress the dynamically-generated graphics resource according to the selected compression procedure; and
      store the compressed dynamically-generated graphics resource in a memory unit.

2. The apparatus of claim 1, the logic to determine a memory bandwidth consumption metric based on the one or more usage characteristics and determine whether to compress the dynamically-generated graphics resource based on the memory bandwidth consumption metric.

3. The apparatus of claim 1, the graphics quality threshold indicating an acceptable degree of quality reduction for the dynamically-generated graphics resource.

4. The apparatus of claim 1, the logic to select the compression procedure from among a plurality of lossy compression procedures.

5. The apparatus of claim 4, the logic to select, from among the plurality of lossy compression procedures, a most compressive lossy compression procedure for which a corresponding graphics quality metric is not less than the graphics quality threshold.

6. The apparatus of claim 1, the logic to retrieve the compressed dynamically-generated graphics resource from the memory unit, decompress the compressed dynamically-generated graphics resource, and generate the graphics frame based on the decompressed dynamically-generated graphics resource.

7. The apparatus of claim 1, the logic to determine whether to compress the dynamically-generated graphics resource based on the one or more usage characteristics and the graphics quality threshold for the dynamically-generated graphics resource.

8. The apparatus of claim 1, comprising:
a display;
a radio frequency (RF) transceiver; and
one or more RF antennas.

9. At least one non-transitory computer-readable storage medium comprising a set of instructions that, in response to being executed on a computing device, cause the computing device to:
determine, during a pass of a generation process for a graphics frame, one or more usage characteristics that indicate how frequently a dynamically-generated graphics resource will traverse a memory bus during a remainder of the generation process for the graphics frame;
determine whether to compress the dynamically-generated graphics resource based on the one or more usage characteristics; and
in response to a determination to compress the dynamically-generated graphics resource:
select a compression procedure based on a graphics quality threshold for the dynamically-generated graphics resource;
compress the dynamically-generated graphics resource according to the selected compression procedure; and
store the compressed dynamically-generated graphics resource in a memory unit.

10. The at least one non-transitory computer-readable storage medium of claim 9, comprising instructions that, in response to being executed on the computing device, cause the computing device to:
determine a memory bandwidth consumption metric based on the one or more usage characteristics; and
determine whether to compress the dynamically-generated graphics resource based on the memory bandwidth consumption metric.

11. The at least one non-transitory computer-readable storage medium of claim 9, the graphics quality threshold indicating an acceptable degree of quality reduction for the dynamically-generated graphics resource.

12. The at least one non-transitory computer-readable storage medium of claim 9, comprising instructions that, in response to being executed on the computing device, cause the computing device to select the compression procedure from among a plurality of lossy compression procedures.

13. The at least one non-transitory computer-readable storage medium of claim 12, comprising instructions that, in response to being executed on the computing device, cause the computing device to select, from among the plurality of lossy compression procedures, a most compressive lossy compression procedure for which a corresponding graphics quality metric is not less than the graphics quality threshold.

14. The at least one non-transitory computer-readable storage medium of claim 9, comprising instructions that, in response to being executed on the computing device, cause the computing device to:
retrieve the compressed dynamically-generated graphics resource from the memory unit;
decompress the compressed dynamically-generated graphics resource; and
generate the graphics frame based on the decompressed dynamically-generated graphics resource.

15. The at least one non-transitory computer-readable storage medium of claim 9, comprising instructions that, in response to being executed on the computing device, cause the computing device to determine whether to compress the dynamically-generated graphics resource based on the one or more usage characteristics and the graphics quality threshold for the dynamically-generated graphics resource.

16. A method, comprising:
determining, during a pass of a generation process for a graphics frame, one or more usage characteristics that indicate how frequently a dynamically-generated graphics resource will traverse a memory bus during a remainder of the generation process for the graphics frame;
determining, by a processor circuit, whether to compress the dynamically-generated graphics resource based on the one or more usage characteristics; and
in response to a determination to compress the dynamically-generated graphics resource:
selecting a compression procedure based on a graphics quality threshold for the dynamically-generated graphics resource;
compressing the dynamically-generated graphics resource according to the selected compression procedure; and
storing the compressed dynamically-generated graphics resource in a memory unit.

17. The method of claim 16, comprising:
determining a memory bandwidth consumption metric based on the one or more usage characteristics; and
determining whether to compress the dynamically-generated graphics resource based on the memory bandwidth consumption metric.

18. The method of claim 16, the graphics quality threshold indicating an acceptable degree of quality reduction for the dynamically-generated graphics resource.

19. The method of claim 16, comprising selecting the compression procedure from among a plurality of lossy compression procedures.

20. The method of claim 19, comprising selecting, from among the plurality of lossy compression procedures, a most compressive lossy compression procedure for which a corresponding graphics quality metric is not less than the graphics quality threshold.

21. The method of claim 16, comprising:
retrieving the compressed dynamically-generated graphics resource from the memory unit;
decompressing the compressed dynamically-generated graphics resource; and
generating the graphics frame based on the decompressed dynamically-generated graphics resource.

22. The method of claim 16, comprising determining whether to compress the dynamically-generated graphics resource based on the one or more usage characteristics and the graphics quality threshold for the dynamically-generated graphics resource.

* * * * *